(12) United States Patent
Botkin et al.

(10) Patent No.: US 8,061,091 B2
(45) Date of Patent: Nov. 22, 2011

(54) PHOTOVOLTAIC MODULE KIT INCLUDING CONNECTOR ASSEMBLY FOR NON-PENETRATING ARRAY INSTALLATION

(75) Inventors: Jonathan Botkin, El Cerrito, CA (US); Simon Graves, Berkeley, CA (US); Matt Danning, Oakland, CA (US); Matthew Culligan, Berkeley, CA (US)

(73) Assignee: Sunpower Corporation, San Jose, CA (US)

( * ) Notice: Subject to any disclaimer, the term of this patent is extended or adjusted under 35 U.S.C. 154(b) by 131 days.

(21) Appl. No.: 12/492,680

(22) Filed: Jun. 26, 2009

(65) Prior Publication Data
US 2009/0320905 A1  Dec. 31, 2009

Related U.S. Application Data

(60) Provisional application No. 61/076,479, filed on Jun. 27, 2008.

(51) Int. Cl.
*E04D 13/18* (2006.01)
*H01L 31/042* (2006.01)
(52) U.S. Cl. ........ 52/173.3; 136/251; 136/244; 126/623
(58) Field of Classification Search ................ 52/173.3, 52/582.1, 584.1, 578; 136/230, 251, 244; 126/623, 704; 248/910, 237, 346.01
See application file for complete search history.

(56) References Cited

U.S. PATENT DOCUMENTS

| | | | | |
|---|---|---|---|---|
| 4,226,256 A * | 10/1980 | Hawley | ........................ | 136/244 |
| 4,421,943 A | 12/1983 | Withjack | | |
| 5,316,592 A | 5/1994 | Dinwoodie | | |
| 5,497,587 A * | 3/1996 | Hirai et al. | .................... | 52/173.3 |
| 5,571,338 A | 11/1996 | Kadonome et al. | | |
| 5,672,036 A * | 9/1997 | Medal | .............................. | 411/82 |
| 6,537,006 B1 * | 3/2003 | Clark | ............................... | 411/82 |
| 6,570,084 B2 | 5/2003 | Dinwoodie | | |

(Continued)

FOREIGN PATENT DOCUMENTS
DE 102005039495 3/2007
(Continued)

OTHER PUBLICATIONS

Sunlink Corporation, brochure entitled "PV Module Mounting System for Flat Roofs & Ground Mounts"; ©2000-2007; 12 pgs.

(Continued)

*Primary Examiner* — Robert Canfield
*Assistant Examiner* — Babajide Demuren
(74) *Attorney, Agent, or Firm* — Blakely, Sokoloff, Taylor & Zafmann LLP

(57) ABSTRACT

A PV module kit for non-penetrating rooftop installation, including a plurality of PV modules and a plurality of connectors. Each of the PV modules includes a PV laminate and a frame forming a mounting region assembled thereto. The connectors include a male connector having a male fastener extending from a head, and a female connector having a female fastener assembled within a head. The heads are entirely formed of plastic. The kit provides a mounted array state including a junction at which the mounting region of at least two of the PV modules are aligned and interconnected by engagement of the male connector with the female connector. The so-formed junction is substantially electrically insulated. The plurality of connectors can further include a spacer connector including a head forming a bore sized to slidably receive the male fastener, with all of the connector heads being identical.

25 Claims, 23 Drawing Sheets

U.S. PATENT DOCUMENTS

| | | | |
|---|---|---|---|
| 6,606,823 B1 * | 8/2003 | McDonough et al. | 47/65.9 |
| 6,617,507 B2 | 9/2003 | Mapes et al. | |
| 6,672,018 B2 | 1/2004 | Shingleton | |
| 6,809,251 B2 | 10/2004 | Dinwoodie | |
| 6,809,253 B2 | 10/2004 | Dinwoodie | |
| 7,155,870 B2 | 1/2007 | Almy | |
| 7,178,295 B2 | 2/2007 | Dinwoodie | |
| 7,297,866 B2 | 11/2007 | Aschenbrenner | |
| 7,531,741 B1 * | 5/2009 | Melton et al. | 136/246 |
| 2004/0094194 A1 * | 5/2004 | Aldoretta et al. | 136/251 |
| 2004/0261955 A1 * | 12/2004 | Shingleton et al. | 160/84.06 |
| 2005/0126621 A1 | 6/2005 | Dinwoodie et al. | |
| 2006/0053706 A1 | 3/2006 | Russell | |
| 2006/0090789 A1 * | 5/2006 | Thompson | 136/246 |
| 2006/0196128 A1 * | 9/2006 | Duke | 52/173.3 |
| 2007/0151594 A1 | 7/2007 | Mascolo et al. | |
| 2007/0196195 A1 * | 8/2007 | Lin | 411/161 |
| 2008/0087320 A1 | 4/2008 | Mapes et al. | |

FOREIGN PATENT DOCUMENTS

| | | |
|---|---|---|
| JP | 2006274591 A1 | 10/2006 |
| WO | WO-03098126 | 11/2003 |
| WO | 2007/079382 A2 | 7/2007 |
| WO | WO-2007103882 | 9/2007 |

OTHER PUBLICATIONS

Sunlink brochure entitled "PV Module Mounting System"; undated; 4 pgs.

Sunpower Corporation brochure entitled "T10 Solar Roof Tile"; available at www.sunpowercorp.com; 2 pgs.

International Search Report and WO for PCT Patent Application No. PCT/US2009/049082 Mailed Nov. 25, 2010, 15 Pages.

International Preliminary Report on Patentability for International Patent Application No. PCT/US2009/049082, Mailed Jan. 13, 2011, 10 pages.

* cited by examiner

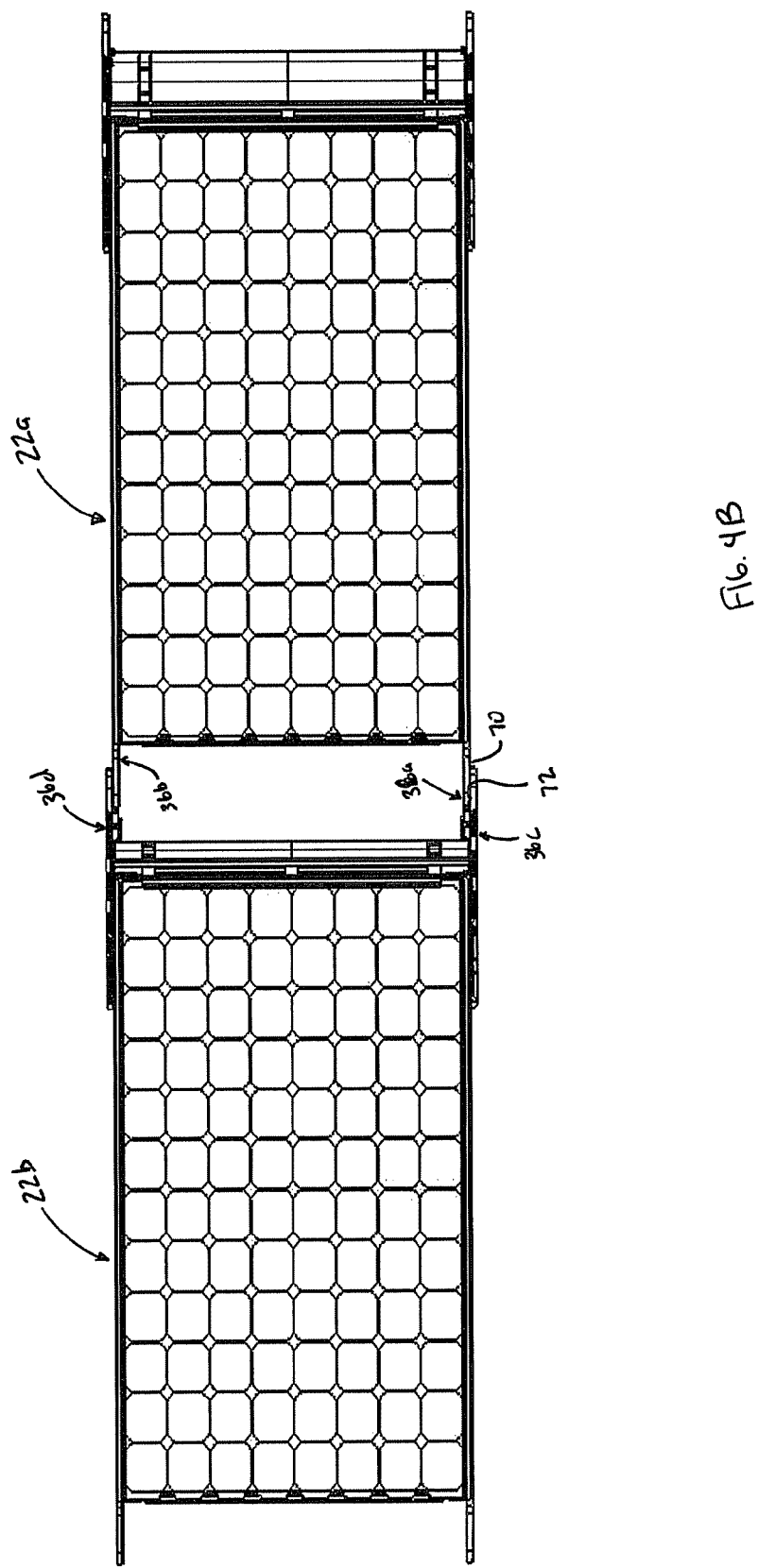

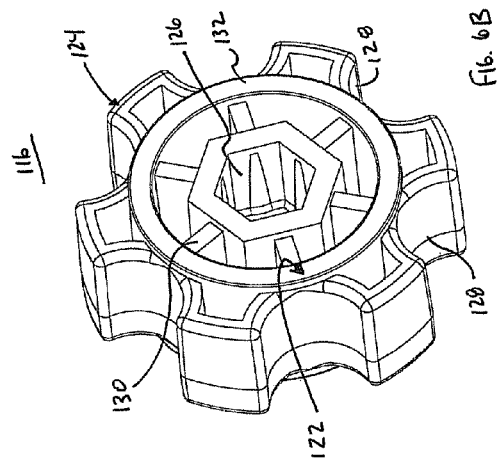
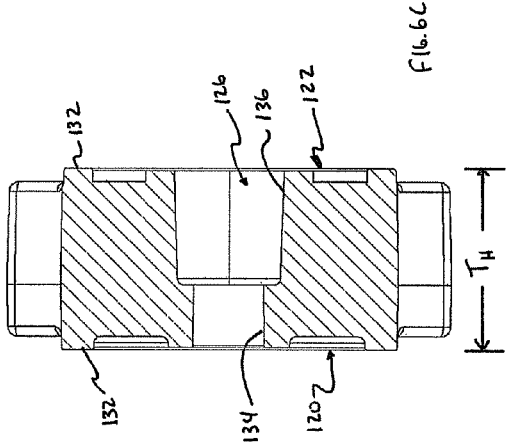
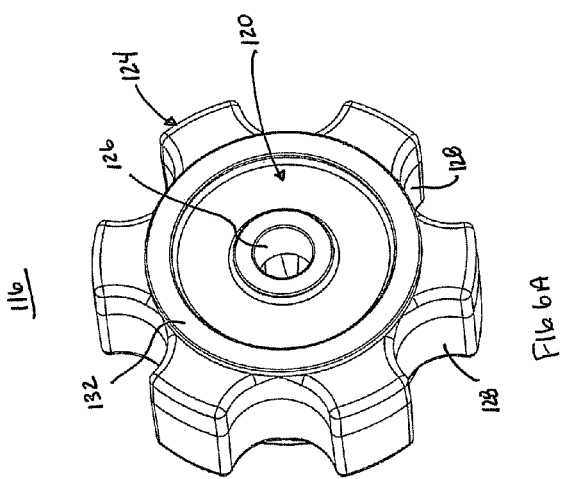

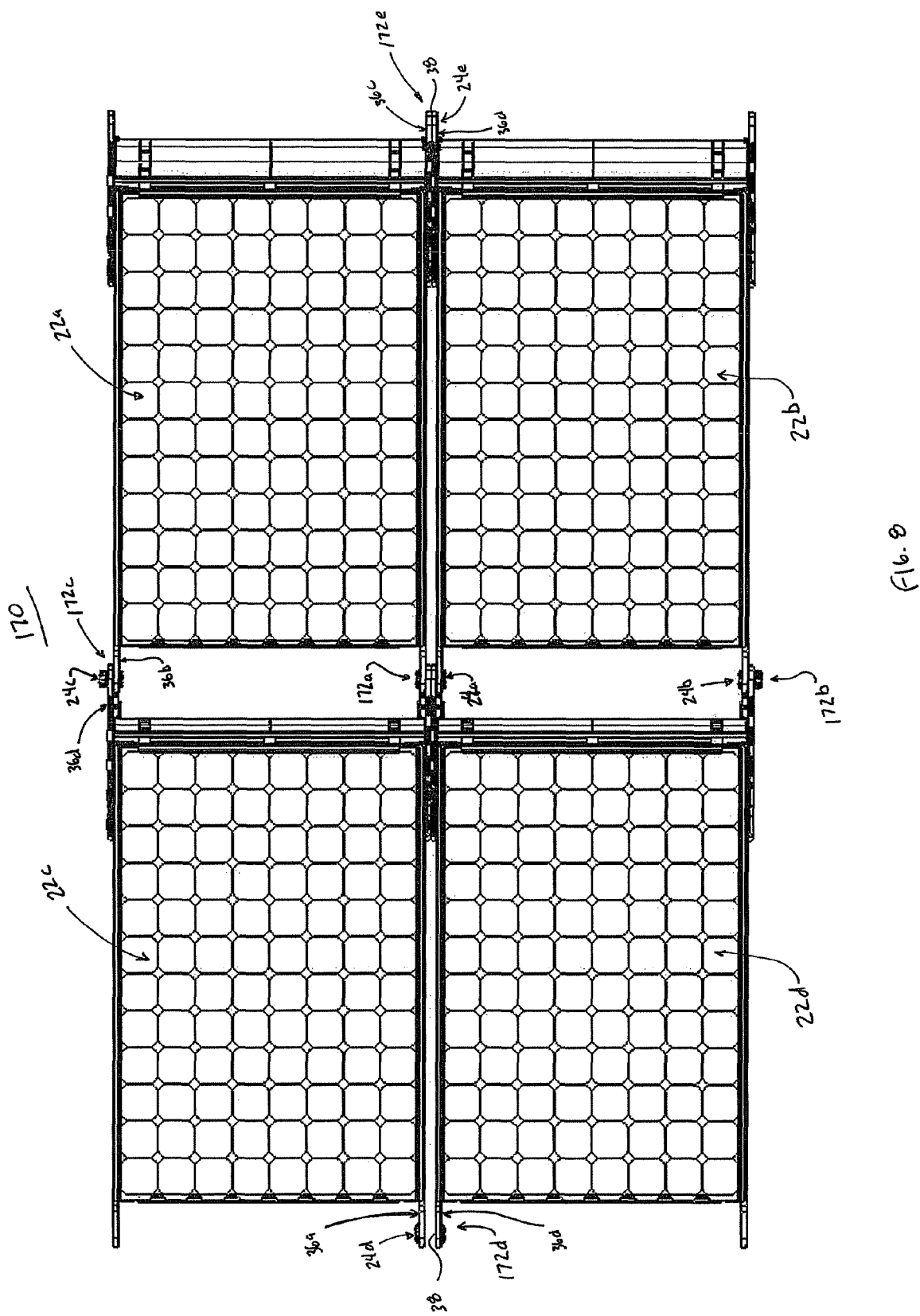

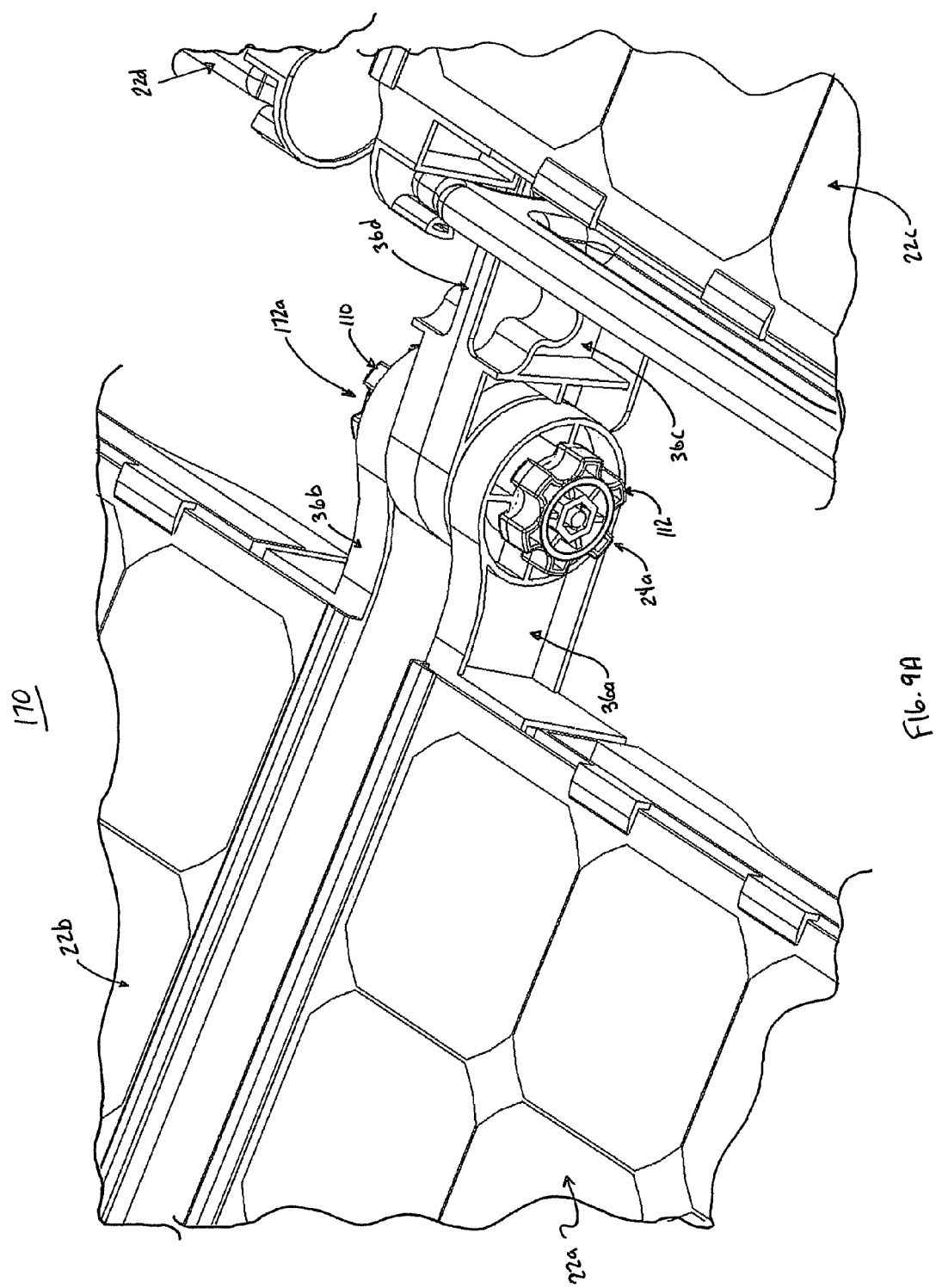

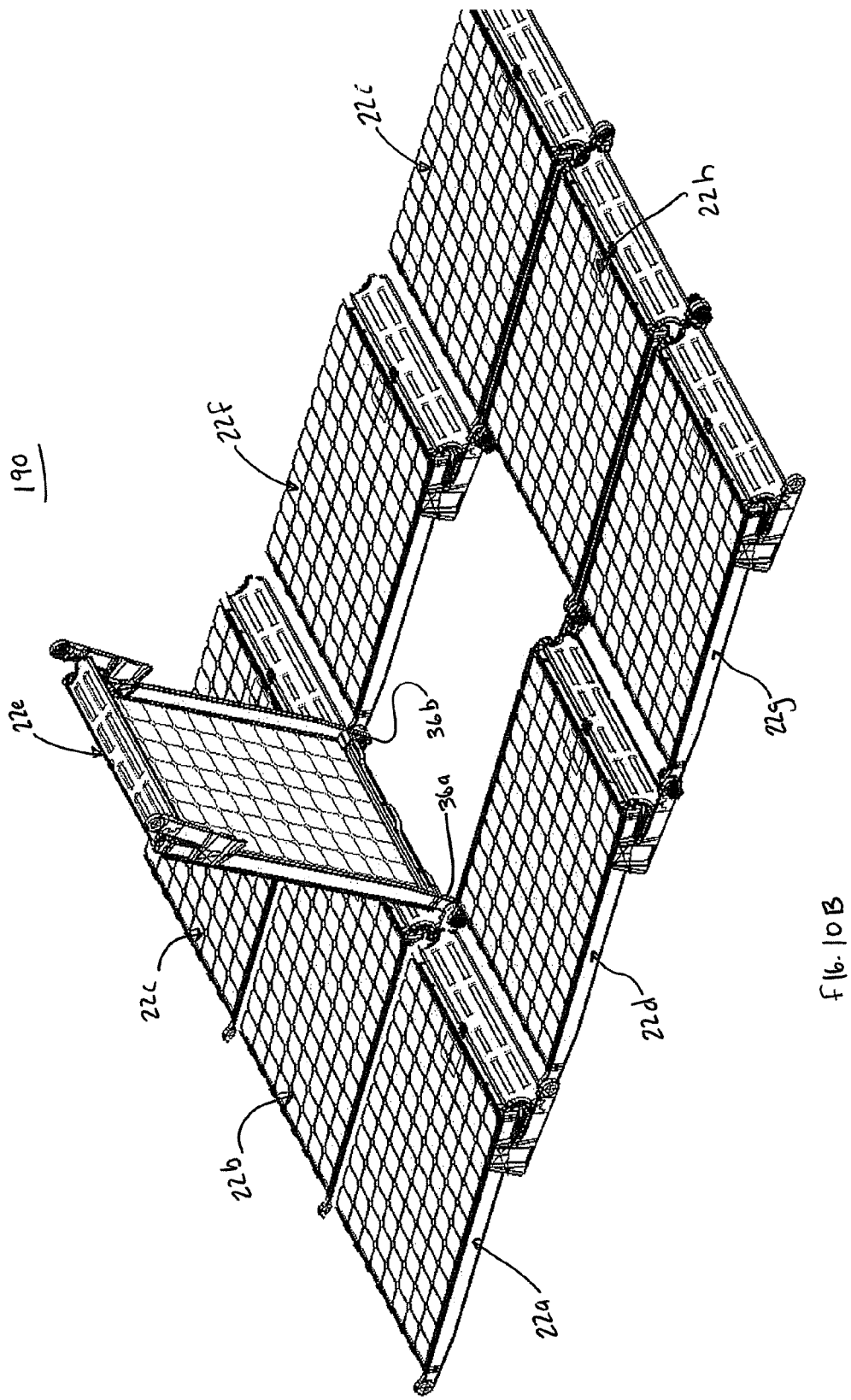

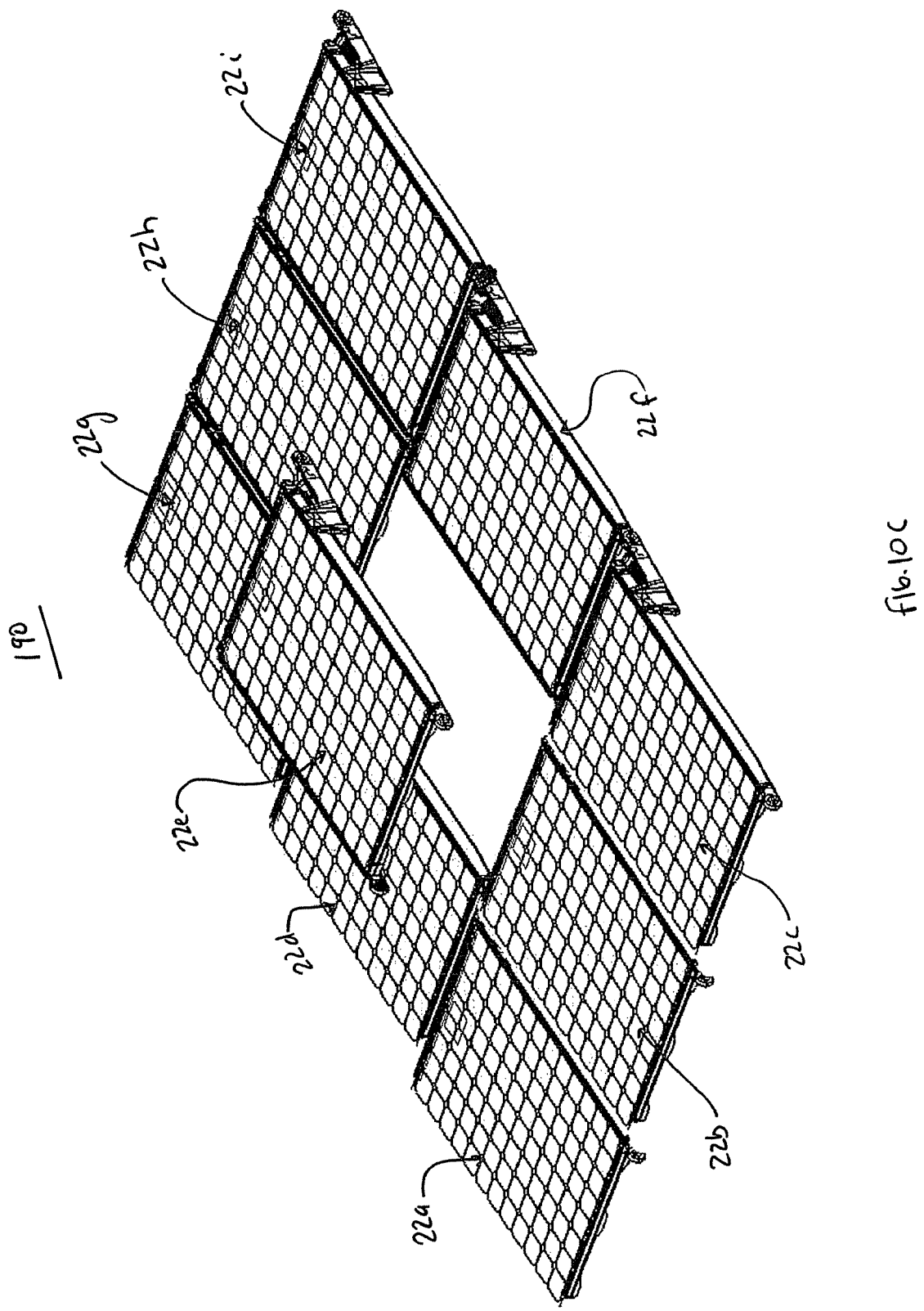

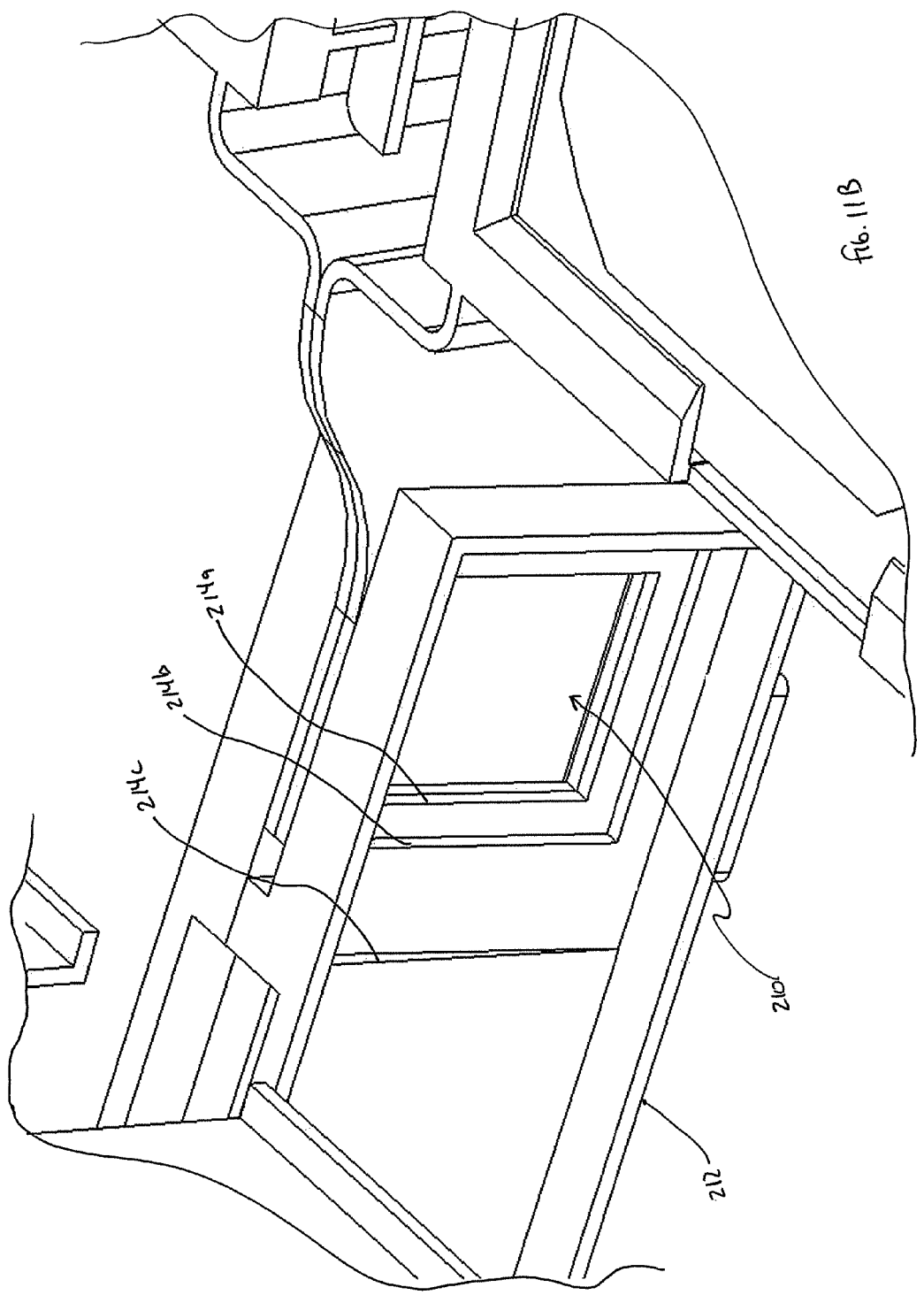

PHOTOVOLTAIC MODULE KIT INCLUDING CONNECTOR ASSEMBLY FOR NON-PENETRATING ARRAY INSTALLATION

PRIORITY DATA

This application claims priority under 35 U.S.C. §119(e)(1) to U.S. Provisional Patent Application Ser. No. 61/076,479, filed Jun. 27, 2008, entitled "Photovoltaic Module Kit Including Connector Assembly for Non-Penetrating Array Installation", and bearing Attorney Docket No. S0132/S812.102.101; and the entire teachings of which are incorporated herein by reference.

CROSS-REFERENCE TO RELATED APPLICATIONS

This application also relates to U.S. application Ser. No. 12/492,640 entitled "Ballasted Photovoltaic Module and Module Arrays"; U.S. application Ser. No. 12/492,729 entitled "Photovoltaic Module with Removable Wind Deflector"; U.S. application Ser. No. 12/492,802 entitled "Photovoltaic Module and Module Arrays"; and U.S. application Ser. No. 12/492,838 entitled "Photovoltaic Module with Drainage Frame"; all of which were filed on even date herewith and the teachings of each of which are incorporated herein by reference.

STATEMENT REGARDING FEDERALLY SPONSORED RESEARCH OR DEVELOPMENT

This invention was made with Government support under Contract No. DE-FC36-07GO17043 awarded by the United States Department of Energy. The Government has certain rights in this invention.

BACKGROUND

The present disclosure relates to solar roof tiles. More particularly, it relates to photovoltaic modules and related connector assemblies for effectuating self-supporting installation.

Solar power has long been viewed as an important alternative energy source. To this end, substantial efforts and investments have been made to develop and improve upon solar energy collection technology. Of particular interest are industrial- or commercial-type applications in which relatively significant amounts of solar energy can be collected and utilized in supplementing or satisfying power needs.

Solar photovoltaic technology is generally viewed as an optimal approach for large scale solar energy collection, and can be used as a primary and/or secondary (or supplemental) energy source. In general terms, solar photovoltaic systems (or simply "photovoltaic systems") employ solar panels made of silicon or other materials (e.g., III-V cells such as GaAs) to convert sunlight into electricity. More particularly, photovoltaic systems typically include a plurality of photovoltaic (PV) modules (or "solar tiles") interconnected with wiring to one or more appropriate electrical components (e.g., switches, inverters, junction boxes, etc.). The PV module conventionally consists of a PV laminate or panel generally forming an assembly of crystalline or amorphous semiconductor devices electrically interconnected and encapsulated. One or more electrical conductors are carried by the PV laminate through which the solar-generated current is conducted.

Regardless of an exact construction of the PV laminate, most PV applications entail placing an array of PV modules at the installation site in a location where sunlight is readily present. This is especially true for commercial or industrial applications in which a relatively large number of PV modules are desirable for generating substantial amounts of energy, with the rooftop of the commercial building providing a convenient surface at which the PV modules can be placed. As a point of reference, many commercial buildings have large, flat roofs that are inherently conducive to placement of a PV module array, and is the most efficient use of existing space. While rooftop installation is thus highly viable, certain environment constraints must be addressed. For example, the PV laminate is generally flat or planar; thus, if simply "laid" on an otherwise flat rooftop, the PV laminate may not be optimally positioned/oriented to collect a maximum amount of sunlight throughout the day. Instead, it is desirable to tilt the PV laminate at a slight angle relative to the rooftop (i.e., toward the southern sky for northern hemisphere installations, or toward the northern sky for southern hemisphere installations). Further, possible PV module displacement due to wind gusts must be accounted for, especially where the PV laminate is tilted relative to the rooftop as described above.

To address the above concerns, conventional PV module array installation techniques have included physically interconnecting each individual PV module of the array directly with, or into, the existing rooftop structure. For example, some PV module configurations have included multiple frame members that are physically attached to the rooftop via bolts driven through (or penetrating) the rooftop. While this technique may provide a more rigid attachment of the PV module, it is a time-consuming process and permanently damages the rooftop. Also, because holes are formed into the rooftop, distinct opportunities for water damage arise. More recently, PV module configurations have been devised for commercial, flat rooftop installation sites in which the arrayed PV modules are self-maintained relative to the rooftop in a non-penetrating manner. More particularly, the PV modules are interconnected to one another via a series of separate, auxiliary components. One or more wind-deflecting barriers (or "wind deflectors") are assembled to some or all of the PV modules to reduce (or deflect) a magnitude of wind forces imparted upon an underside of the PV module and/or array. Additional ballast is also oftentimes attached to the array.

In light of the above, the components and techniques employed to interconnect adjacent PV modules are important to the success of an installed, non-penetrating PV module array. In general terms, a typical array consists of PV modules arranged in columns and rows, forming a rectangular grid. By interconnecting the PV modules, each row contributes to the prevention of overturning of an adjacent row. With a rigid connection, the weight/mass of one row resists or offsets the moment force created at the connection point with an adjacent row otherwise being subjected to overturning forces. Each PV module effectively defines four corners; at most locations within the grid, then, four PV modules will come together to define a junction point, and the corners of the PV four modules forming the junction must be joined. However, there will be many instances within an array when one or more of these four PV module corners is "missing". For example, along the south edge of the array, only two PV module corners will be joined together at the corresponding junction point. With conventional non-penetrating PV module arrays, differing connective components are required to accommodate the various junction configurations (e.g., a first connection device for a four PV module junction and a different, second connection device for a two PV module junction). This, in turn, increases overall costs and installation time, as well as the level of expertise required of the installer. Along these same lines, conventional PV module connection techniques entail the use of one or more hand tools, again increasing installation time and thus costs. Further, metal components are typically used for joining adjacent PV modules; while viable, the metal couplings (and other metal components of the array) raise electrical grounding concerns.

In light of the above, any improvements in the construction of PV modules and associated connecting components for non-penetrating installation as a PV module array will be well-received.

SUMMARY

Some aspects in accordance with the present disclosure relate to a PV module kit for non-penetrating installation on a substantially flat installation surface. The kit includes a plurality of PV modules and a plurality of connectors. Each of the PV modules includes a PV laminate and a frame assembled thereto. In this regard, the frame forms at least one mounting region. The connectors include a male connector having a male fastener extending from a head, and a female connector having a female fastener assembled within the head. The female fastener is adapted for engagement with the male fastener. Further, the heads are entirely formed of plastic. With this in mind, the kit is configured to provide a mounted array state including a junction at which the mounting region of at least two of the PV modules are aligned and interconnected by engagement of the male connector with the female connector. The so-formed junction is substantially electrically insulated. With this construction, the kit facilitates non-penetrating installation in a manner that does not require additional components to electrically ground the junction. In some embodiments, the male and female fasteners are metal, with the junction having the metal fasteners substantially encompassed within plastic provided by the connector heads and the PV module frames otherwise forming the junction. In other embodiments, the plurality of connectors further include a spacer connector including a head forming a bore sized to slidably receive a portion of the male fastener. With some constructions, all of the heads associated with the provided connectors are identically formed.

Other aspects in accordance with principles of the present disclosure relate to a PV module kit including a plurality of identically-formed PV modules and a plurality of identically-formed connector heads. Each of the PV modules includes a PV laminate, framework, and four arms. The framework encompasses a perimeter of the PV laminate. The first and second arms extend from, and outwardly beyond, a first side of the framework, whereas the third and fourth arms extend from, and outwardly beyond, a second end of the framework opposite the first end. Each of the arms forms a mounting region, and each of the connector heads form a bore. Further, a plurality of male fasteners are attached to and extend from some of the connector heads, respectively, to define a plurality of male connectors. Similarly, a plurality of female fasteners are attached to some of the connector heads, respectively, to define a plurality of female connectors. Finally, at least some of the remaining connector heads define spacer connectors. With this in mind, the kit is configured to provide a plurality of installation junctions in a mounted array state, with each junction including at least the PV modules mounted to one another. In particular, a plurality of first junctions are provided, each including one of the male connectors and one of the female connectors interconnecting the mounting regions of four of the PV modules, respectively. Further, a plurality of second junctions are provided each including one of the male connectors, one of the female connectors, and two of the spacer connectors interconnecting the mounting regions of two of the PV modules, respectively. In some embodiments, the framework, the arms, and the heads are all entirely formed of plastic, thereby minimizing electrical grounding concerns.

Yet other aspects in accordance with the present disclosure relate to a PV installation comprising an array of PV modules and first-fourth connector assemblies. The array comprises rows and columns of identical PV modules, including a first PV module having a PV laminate, framework encompassing a perimeter of the PV laminate, and first-fourth arms. The first and second arms extend from, and outwardly beyond, a first end of the framework, whereas the third and fourth arms extend from, and outwardly beyond, a second end of the framework opposite the first end. The first connector assembly removably interconnects the first arm with a PV module adjacent the first PV module; the second connector assembly removably interconnects the second arm with a PV module adjacent the first PV module; etc. In this regard, each of the connector assemblies includes a male connector comprising a head and a male fastener, and a female connector comprising an identical head and a female fastener. In some embodiments, each of the connector assemblies are transitionable by hand between a tightened state, a loosened state, and a removed state. In the tightened state, the corresponding PV modules are rigidly connected. In the loosened state, the corresponding PV modules are rotatable relative to the connector assembly. With this construction, where the first and second connector assemblies are in the loosened state and the third and fourth connector assemblies are in the removed state, the first PV module is pivotable relative to the array at the first and second arms.

Yet other aspects in accordance with principles of the present disclosure relate to a method of non-penetrating installation of a PV module array to an installation surface. The method includes providing a plurality of PV modules each including a PV laminate, framework encompassing a perimeter of the PV laminate, and a plurality of arms extending from, and outwardly beyond, the framework. Each of the arms forms a mounting region. The PV modules are arranged in an array on the installation surface, with the array including rows and columns. At least one arm of each of the PV modules is rigidly interconnected with at least one arm of another, adjacent one of the PV modules via a corresponding connector assembly comprising at least a male connector and a female connector. In this regard, the step of rigidly interconnecting the PV modules is accomplished by hand without the use of a tool.

BRIEF DESCRIPTION OF THE DRAWINGS

FIG. 4B is a top view of two of the photovoltaic modules of FIG. 2 mounted in an end-to-end arrangement;

FIGS. 6A and 6B are perspective views of a head component associated with connector assemblies useful with the kit of FIG. 1;

FIG. 6C is a cross-sectional view of the head of FIGS. 6A and 6B;

FIG. 8 is a top view of an installed photovoltaic module array provided by the kit of FIG. 1;

FIG. 9A is an enlarged, perspective view of a junction provided with the array installation of FIG. 8;

FIGS. 10A-10C are perspective views of another photovoltaic module array installation provided by the kit of FIG. 1;

FIG. 11B is a perspective view of a portion of photovoltaic module array provided by a kit in accordance with principles of the present disclosure and incorporating the connector assembly of FIG. 11A.

DETAILED DESCRIPTION

Figure 1:
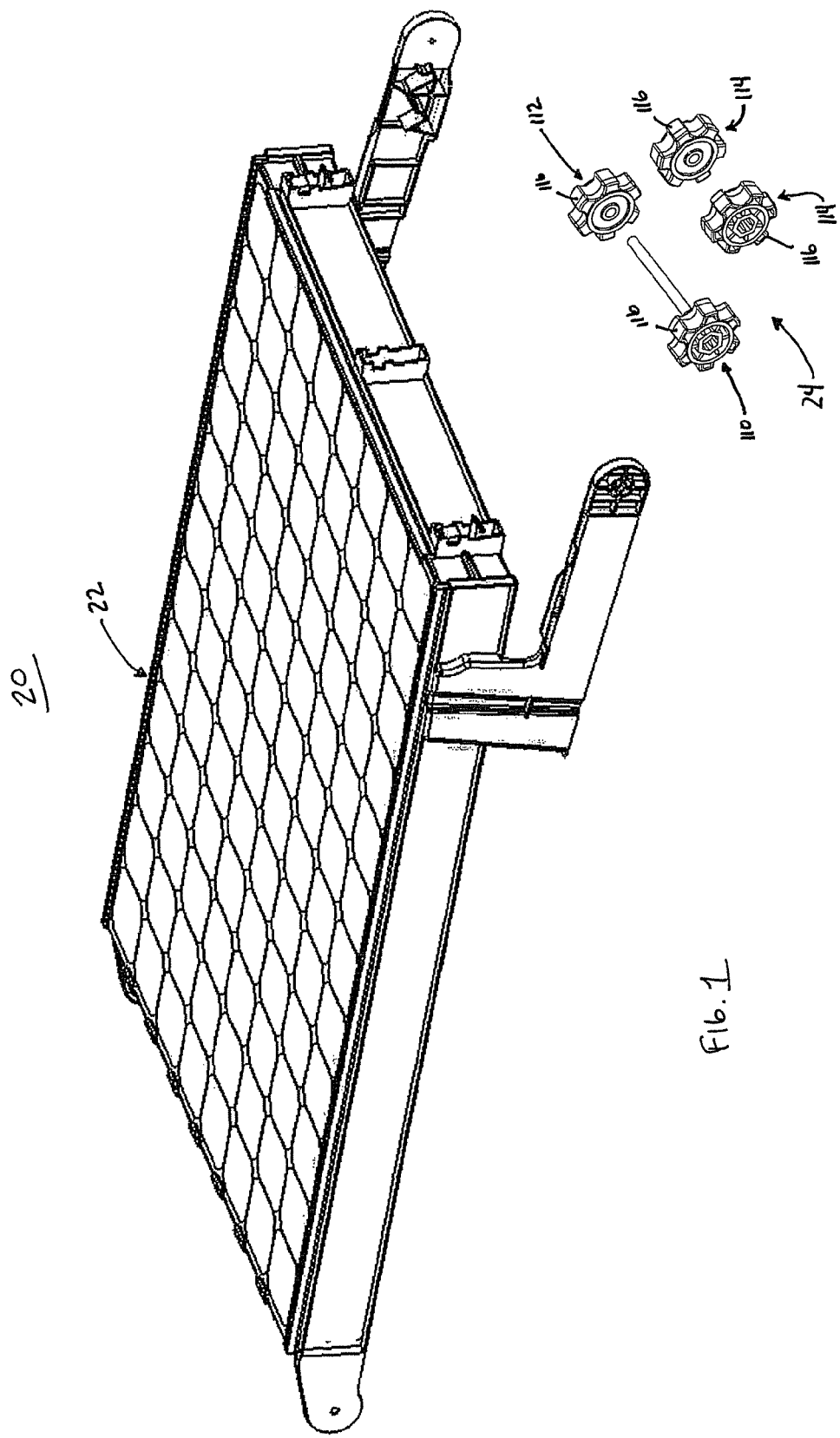
FIG. 1 is an exploded view of a portion of a photovoltaic module kit in accordance with principles of the present disclosure.

One embodiment of a photovoltaic (PV) module kit 20 in accordance with principles of the present disclosure is shown in FIG. 1. The kit 20 includes a plurality of PV modules 22 (one of which is shown in FIG. 1) and a plurality of connector assemblies 24 (one of which is shown in FIG. 1). Details on the various components are provided below. In general terms, however, the kit 20 is configured to provide a non-penetrating installation of the PV modules 22 to an installation surface in an array form, with respective ones of the connector assemblies 24 interconnecting adjacent ones of the PV modules 22 at various junctions. The so-effectuated junctions allow the array to conform to the contours of the installation surface, but resist rotational movements/moment forces upon final installation. In some embodiments, the connector assemblies 24 permit subsequent, partial or complete removal of one of the PV modules 22 from the array as described below.

Figure 2:
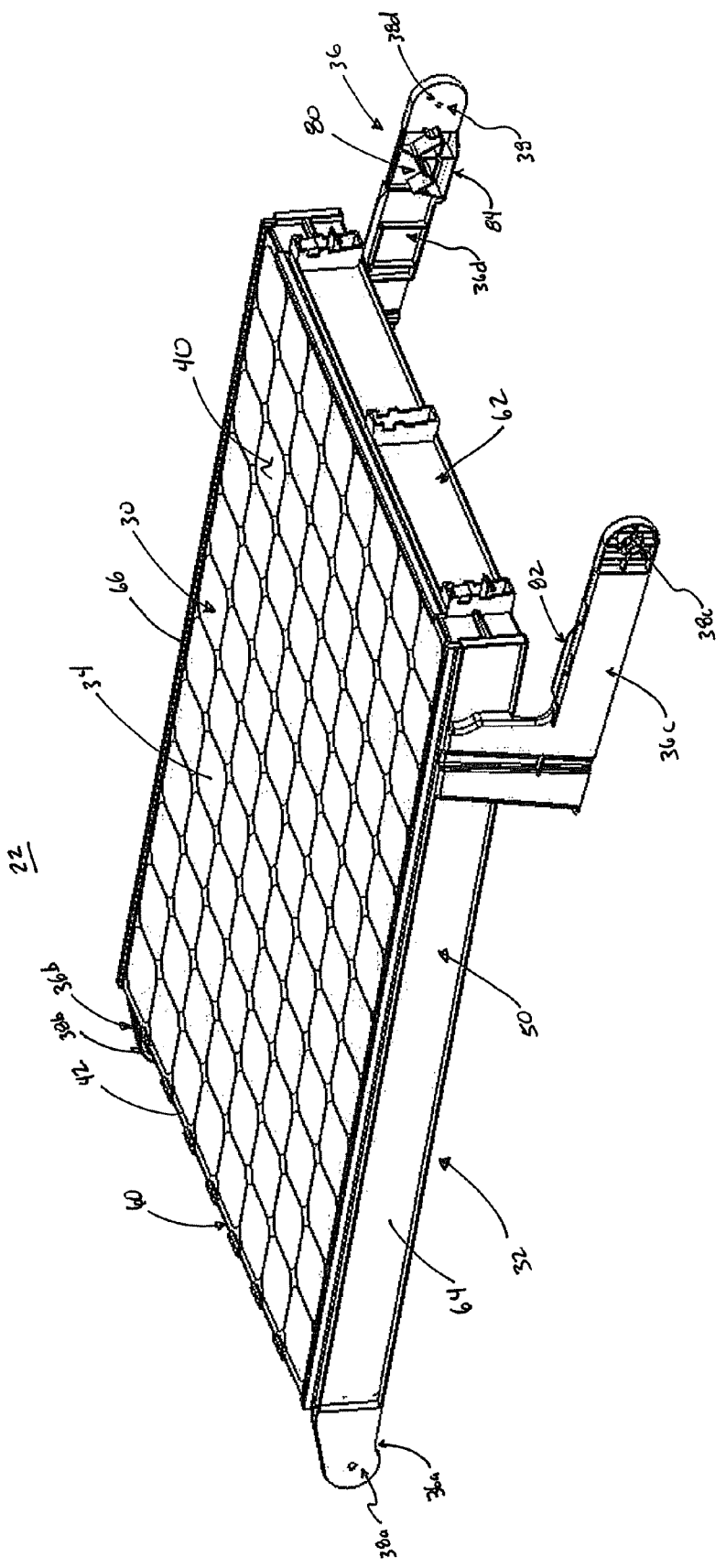
FIG. 2 is a perspective view of a photovoltaic module useful with the kit of FIG. 1.

The PV modules 22 can be identical, with one of the PV modules 22 being shown in greater detail in FIG. 2. The PV module 22 includes a PV device 30 and a frame 32. A PV laminate 34 of the PV device 30 is encased by the frame 32, with the frame 32 providing support faces that effectuate a tilted orientation of the PV laminate 34 relative to a flat installation surface (e.g., a flat rooftop) in some embodiments. In this regard, the frame 32 includes at least one arm 36 (referenced generally) providing a mounting region 38 (referenced generally) that is configured to interface with the connector assembly 24 (FIG. 1) as described below.

The PV module 22 can assume a variety of forms that may or may not be implicated by FIG. 2. For example, the PV device 30, including the PV laminate 34, can have any form currently known or in the future developed that is otherwise appropriate for use a solar photovoltaic device. In general terms, the PV laminate 34 consists of an array of photovoltaic cells. A glass laminate may be placed over the photovoltaic cells for environmental protection. In some embodiments, the photovoltaic cells advantageously comprise backside-contact cells, such as those of the type available from SunPower Corp., of San Jose, Calif. As a point of reference, in backside-contact cells, wirings leading to external electrical circuits are coupled on the backside of the cell (i.e., the side facing away from the sun upon installation) for increased area for solar collection. Backside-contact cells are also disclosed in U.S. Pat. Nos. 5,053,083 and 4,927,770, which are both incorporated herein by reference in their entirety. Other types of photovoltaic cells may also be used without detracting from the merits of the present disclosure. For example, the photovoltaic cells can incorporate thin film technology, such as silicon thin films, non-silicon devices (e.g., III-V cells including GaAs), etc. Thus, while not shown in the figures, in some embodiments, the PV device 30 can include one or more components in addition to the PV laminate 34, such as wiring or other electrical components.

Regardless of an exact construction, the PV laminate 34 can be described as defining a front face 40 and a perimeter 42 (referenced generally in FIG. 2). Additional components (where provided) of the PV device 30 are conventionally located at or along a back face of the PV laminate 34, with the back face being hidden in the view of FIG. 2.

With the above understanding of the PV device 30, and in particular the PV laminate 34, in mind, the frame 32 generally includes framework 50 adapted to encompass the perimeter 42 of the PV laminate 34, along with the at least one arm 36 extending from the framework 50. For example, with the one embodiment of FIG. 2, the frame 32 includes first-fourth arms 36a-36d. The arms 36a-36d, along with other components of the frame 32, are configured to facilitate arrangement of the PV laminate 34 at a tilted or sloped orientation relative to a substantially flat surface, such as a rooftop. For example, the framework 50 can be described as including or providing a leading end or leading frame member 60, a trailing end or trailing frame member 62, a first side or first side frame member 64, and a second side or second side frame member 66.

Figure 3:
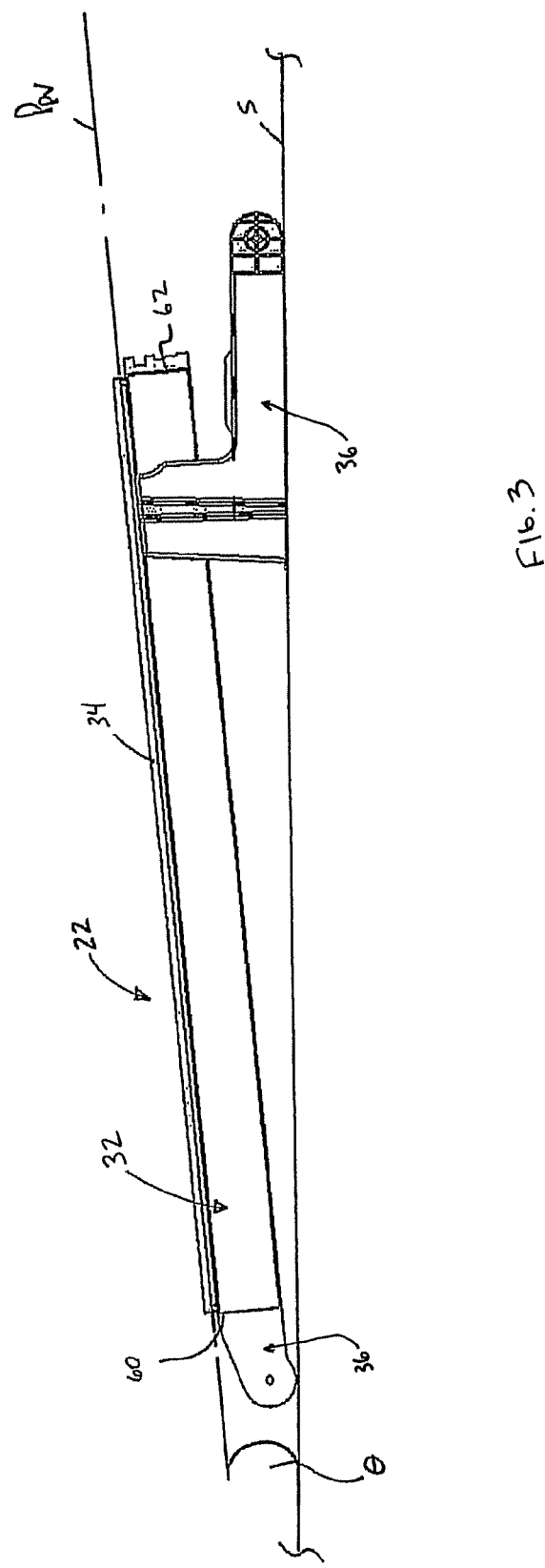
FIG. 3 is a side view of the photovoltaic module of FIG. 2 mounted to an installation surface.

With the above conventions in mind, FIG. 3 provides a simplified illustration of the PV module 22 relative to a flat, horizontal surface S. Though hidden in the view of FIG. 3, a location of the PV laminate 34 is generally indicated, as is a plane $P_{PV}$ of the PV laminate 34 that is otherwise established by the front face 40 (FIG. 2). Relative to the arrangement of FIG. 3, the frame 32 supports the PV laminate 34 relative to the flat surface S at a slope or tilt angle θ. The tilt angle θ can otherwise be defined as an included angle formed between the PV laminate plane $P_{PV}$ and a plane of the flat surface S. In some embodiments, the arms 36 (two of which are shown in FIG. 3) combine to define a support face at which the PV module 22 is supported against, and relative to, the flat surface S, with the tilt angle θ being similarly defined between the PV laminate plane $P_{PV}$ and a plane of the support face. Regardless, with some constructions, the frame 32 is configured to support the PV laminate 34 at a tilt angle θ in the range of 1°-30°, in some embodiments in the range 3°-7°, and in yet other embodiments, at 5°. As a point of reference, with tilted PV solar collection installations, the PV laminate 34 is desirably positioned so as to face or tilt southward (in northern hemisphere installations). Given this typical installation orientation, then, the leading frame member 60 can be generally referred to as a south frame member, and the trailing frame member 62 referred to as a north frame member. In other embodiments, however, the frame 32 can be configured to maintain the PV laminate 34 in a generally parallel relationship relative to the flat surface S.

Returning to FIG. 2, the framework 50 can assume a variety of forms appropriate for encasing the perimeter 42 of the PV laminate 34, as well as establishing the desired tilt angle θ (FIG. 3). In some embodiments, the frame members 60-66 are separately formed and subsequently assembled to one another and the PV laminate 34 in a manner generating the unitary structure upon final construction. Alternatively, other manufacturing techniques and/or components can be employed such that the framework 50 reflected in FIG. 2 is in no way limiting.

As mentioned above, the frame 32 includes at least one of the arms 36a-36d extending from the framework 50 to provide the at least one mounting regions 38c, 38d. With respect to the one non-limiting example of FIG. 2, the first and second support arms 36a, 36b are identical upon final construction of the frame 30, as are the third and fourth arms 36c, 36d. More particularly, the first and second arms 36a, 36b extend from the framework 50, outwardly and beyond the leading frame member 60. With this construction, the mounting region 38a, 38b formed by each of the first and second arms 36a, 36b is located longitudinally beyond (or spaced from) the leading frame member 60. Conversely, the third and fourth arms 36c, 36d extend from the framework 50, outwardly and beyond the trailing frame member 62. As with the first and second arms 36a, 36b, extension of the third and fourth arms 36c, 36d positions the corresponding mounting regions 38c, 38d longitudinally beyond or spaced from the trailing frame member 62.

Figure 4A:
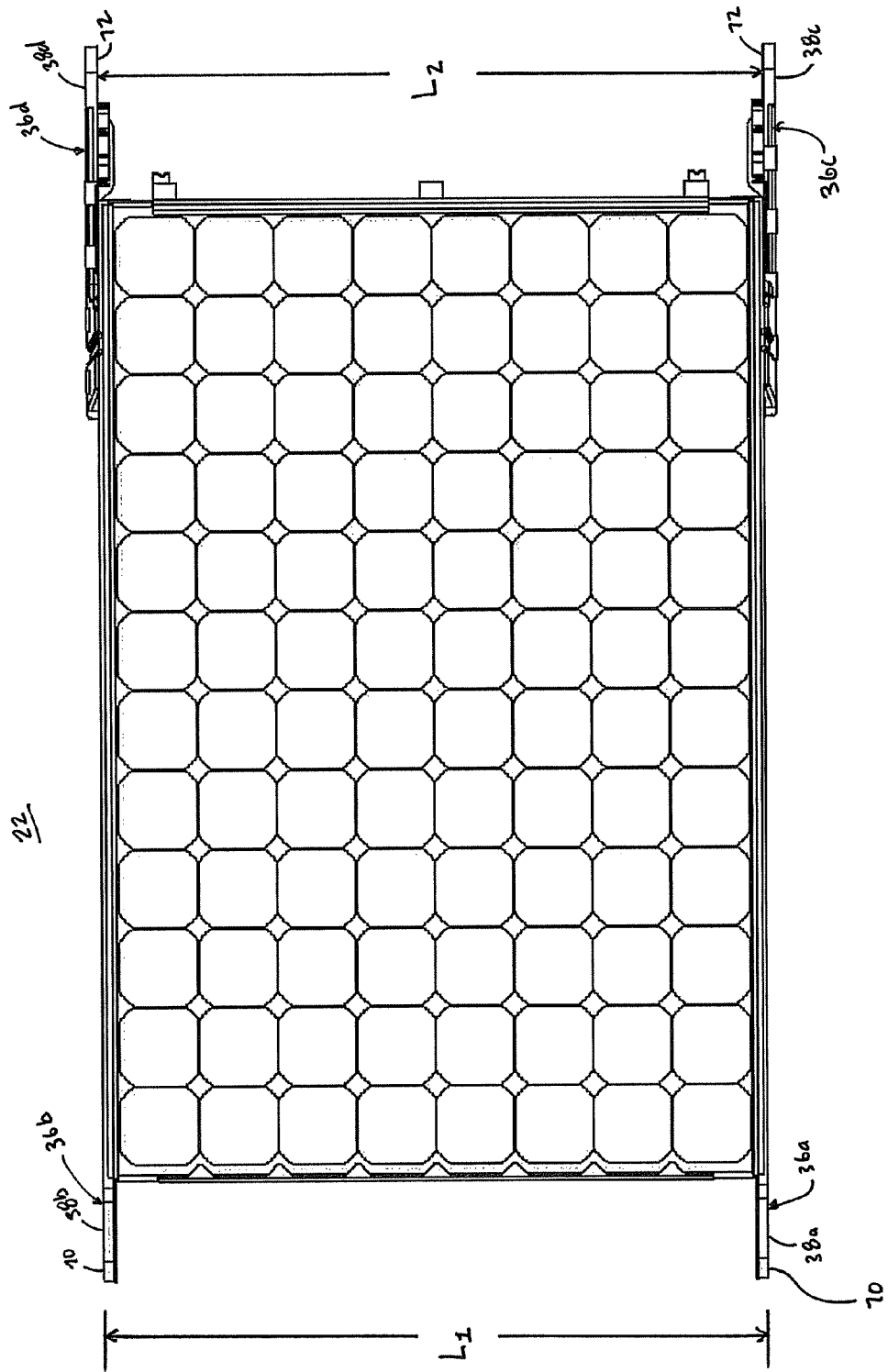
FIG. 4A is a top view of the photovoltaic module of FIG. 2.

The first and second arms 36a, 36b can differ from the third and fourth arms 36c, 36d in certain respects. For example, a lateral spacing between the first and second arms 36a, 36b is less than a lateral spacing between the third and fourth arms 36c, 36d, and is selected to facilitate assembly of two of the PV modules 22 in an end-to-end arrangement as part of an array. For example, and with reference to FIG. 4A, a first or exterior lateral spacing $L_1$ is defined between exterior surfaces 70 of the first and second arms 36a, 36b (at least along the corresponding mounting regions 38a, 38b). A second or interior lateral spacing $L_2$ is defined between interior surfaces 72 of the third and fourth arms 36c, 36d (at least along the corresponding mounting regions 38c, 38d). A distance between the third and fourth arms 36c, 36d is slightly greater than that between the first and second arms 36a, 36b, with the exterior lateral spacing $L_1$ approximating the interior lateral spacing $L_2$. With this construction, then, adjacent PV modules 22a, 22b can be arranged and mounted end-to-end as part of an arrayed installation as shown in FIG. 4B, with the first and second arms 36a, 36b of the first PV module 22a being disposed between the third and fourth arms 36c, 36d of the second PV module 22b. More particularly, the lateral spacing effectuated by the arm pairs 36a, 36b and 36c, 36d positions the exterior surface 70 of the first arm 36a of the first PV module 22a against the interior surface 72 of the third arm 36c of the second PV module 22b. A similar arrangement is achieved with respect to the second arm 36b of the first PV module 22a and the fourth arm 36d of the second PV module 22b.

Returning to FIG. 2, additional, optional differences between the first and second arms 36a, 36b and the third and fourth arms 36c, 36d can include the third and fourth arms 36c, 36d having a longitudinal length (relative to the trailing frame member 62) being greater than a longitudinal length of the first and second arms 36a, 36b (relative to the leading frame member 60). In some embodiments, this additional length or surface area facilitates the provision of one or more optional features with the third and fourth arms 36c, 36d. For example, the third and fourth arms 36c, 36d can include or form a deflector assembly feature 80 (referenced generally for the fourth arm 36d) configured to releasably associate a wind deflector (not shown) with the PV module 22. Further, a ballast connection feature 82 (referenced generally for the third arm 36c) can be provided, configured to facilitate releasable association of a ballast tray (not shown) with the PV module 22. Finally, the third and fourth arms 36c, 36d can form an enlarged bottom surface 84 (referenced generally for the fourth arm 36c), configured to better ensure stable mounting of the PV module 22 onto an installation surface (i.e., the bottom surface 84 forms part of the support face described above with respect to FIG. 3). Additional features can be incorporated into one or more of the arms 36a-36d; alternatively, one or more of the features 80-84 described above can be omitted.

Figure 5A:
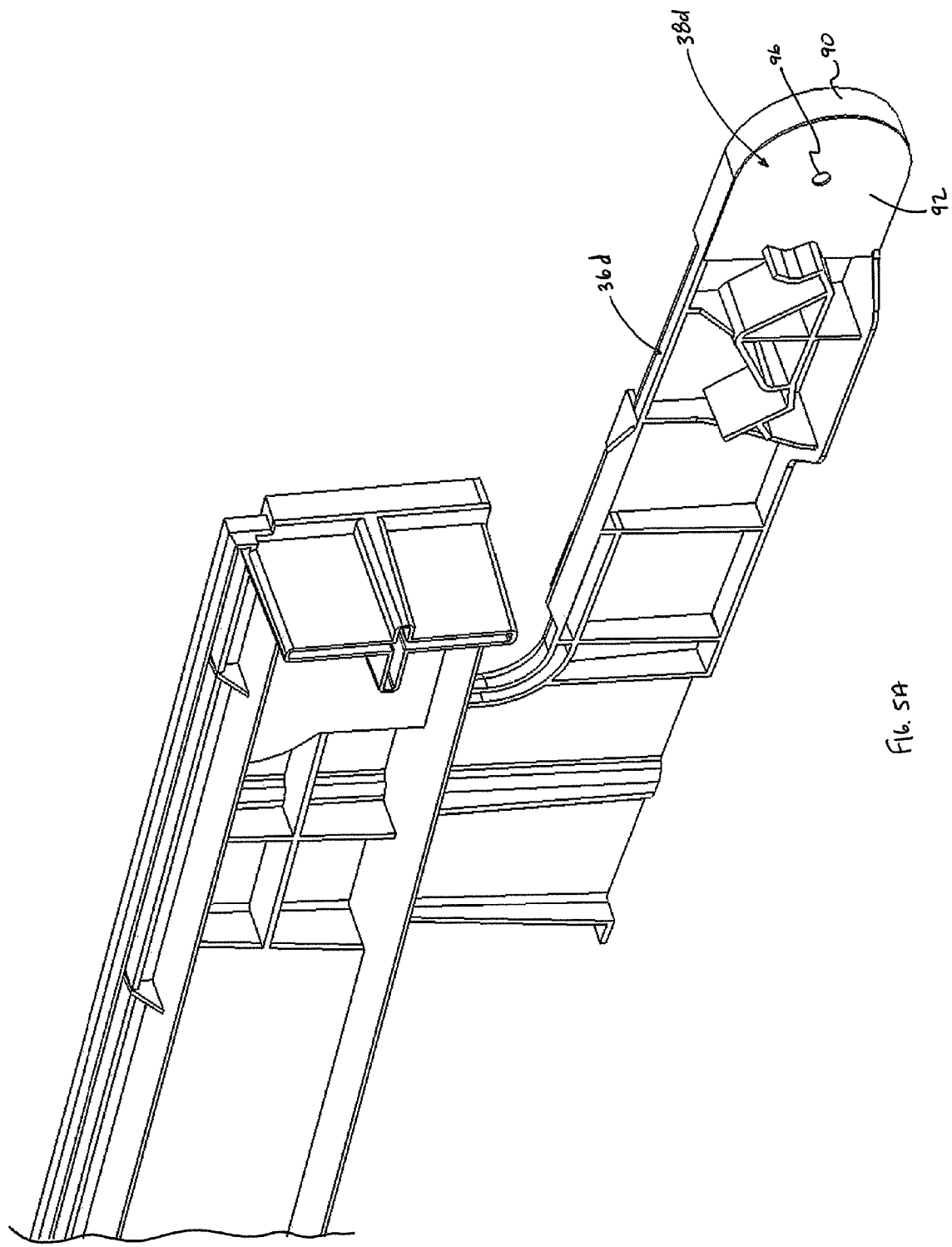
FIGS. 5A and 5B are perspective views illustrating a mounting region provided by the photovoltaic module of FIG. 2.
Figure 5B:
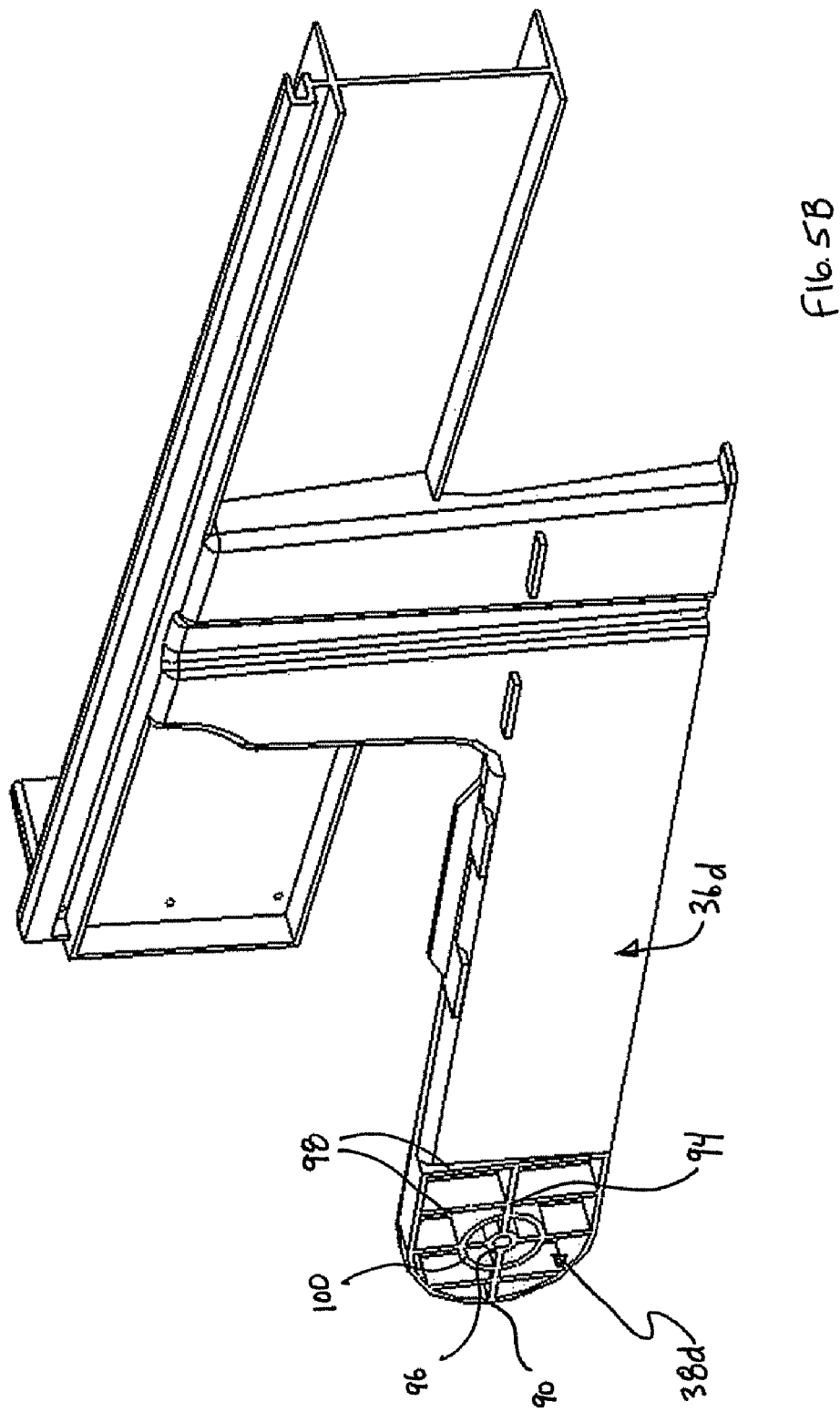

While the first and second arms 36a, 36b can differ from the third and fourth arms 36c, 36d as described above, in some embodiments, the mounting region 38 associated with each of the arms 36a-36d is identical. With this in mind, FIGS. 5A and 5B illustrate the mounting region 38d associated with the fourth arm 36d in greater detail. The mounting region 38d is formed or defined at or adjacent a free end 90 of the arm 36d, and includes an interior face 92 (FIG. 5A), an exterior face 94 (FIG. 5B), and a passage 96. The interior face 92 is relatively flat or smooth in some embodiments, whereas the exterior face 94 can include or be defined by stiffening ribs 98. Alternatively, the exterior face 94 can be relatively smooth or flat, akin to the interior face 92. With the one embodiment of FIG. 5B, however, an engagement surface 100 is provided along the exterior face 94, and is sized to interface with a corresponding component of the connector assembly 24 (FIG. 1) as described below.

Figure 5C:
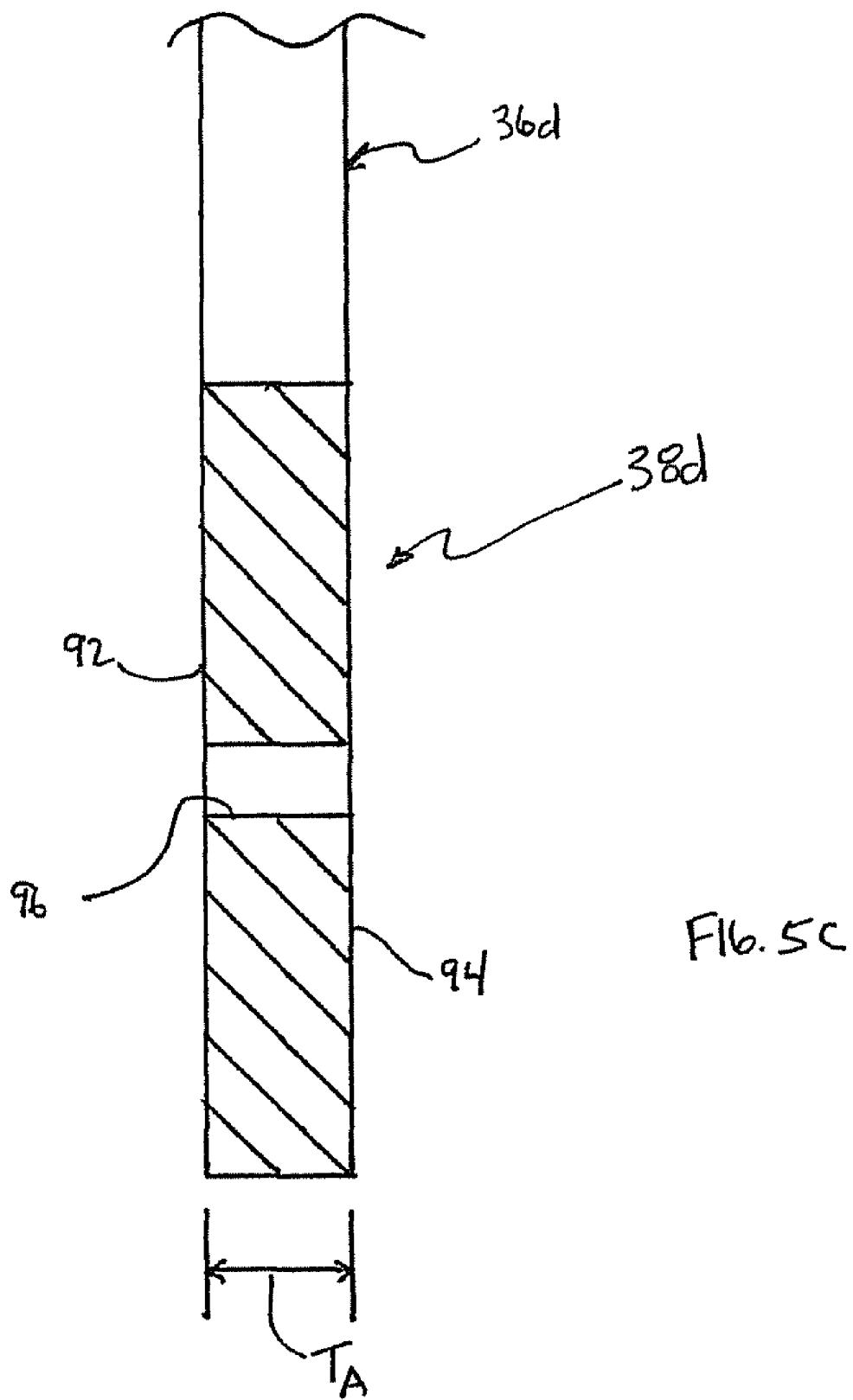
FIG. 5C is a cross-sectional view of the mounting region of FIGS. 5A and 5B.

Regardless of an exact construction, the interior and exterior faces 92, 94 combine to define a thickness $T_A$ of the mounting region 38d as shown in FIG. 5C. The passage 96 extends through the thickness $T_A$, and is open at the interior and exterior faces 92, 94. The passage 96 is sized to receive a component of the connector assembly 24 (FIG. 1) as described below.

The mounting region 38d can alternatively assume a wide variety of other constructions. Similarly, while the arms 36a-36d (FIG. 2) have been described as having identically-formed mounting regions 38 (FIG. 2), in other embodiments, the mounting region 38 can differ for one or more of the arms 36a-36d. In more general terms, then, the mounting region 38 associated with each of the arms 36a-36d is configured to interface with the connector assemblies 24 (FIG. 1) in a manner promoting a frictional, locked engagement therebetween.

Returning to FIG. 1, the connector assemblies 24 each include at least a male connector 110 and a female connector 112. Further, at least some of the connector assemblies 24 includes one or more spacer connectors 114. Details on the various connectors 110-114 are provided below. In general terms, however, each of the connector formats 110-114 includes a head 116, with the heads 116 being identical for all of the connectors 110-114 (as well as for all of the connector assemblies 24 additionally provided with the kit 20).

The head 116 is shown in greater detail in FIGS. 6A-6C. The head 116 is entirely formed of plastic or other electrically non-conductive material (e.g., PPO/PS (Polyphenylene Oxide co-polymer/polystyrene blend) or PET (Polyethylene Terephthalate)), and defines an interior side 120, an exterior side 122, and a perimeter 124. A thickness $T_H$ (FIG. 6C) is defined between the sides 120, 122, with the head 116 further forming a bore 126 that extends between, and is open relative to, the sides 120, 122. As made clear below, the head thickness $T_H$ is commensurate with the mounting region thickness $T_A$ (FIG. 5C) referenced above.

While the head 116 can assume a variety of shapes and sizes differing from those reflected in FIGS. 6A and 6B, in some embodiments the perimeter 124 is generally circular, defining one or more grooves 128 conducive for grasping by a user's finger(s). The sides 120, 122 can also assume a variety of forms, with the head 116 including, in some embodiments, one or more stiffening ribs 130 (FIG. 6B) that otherwise extend from the second side 122. In addition, at least the interior side 120 forms an engagement surface 132. The engagement surface 132 is adapted to establish frictional engagement with the engagement surface 100 (FIG. 5B) of the corresponding frame mounting region 38 (FIG. 1) during use, and can have the ring-like shape as shown. Where the engagement surface 132 is formed as a protrusion of the corresponding side (e.g., the interior side 120 as shown in FIG. 6A), the head thickness $T_H$ is defined at (or relative to) the engagement surface 132.

As described below, the head 116 can be used as part of any of the male, female, or spacer connectors 110-114 (FIG. 1) of the present disclosure, and thus is a universal component to the kit 20 (FIG. 1). For example, the head 116 serves as the spacer connector 114 without further modification. An appropriate fastener is assembled to the head 116 to form the male connector 110 or the female connector 112. For example, the bore 126 is sized and shaped to frictionally receive and maintain a male or female fastener as described below. As best shown in FIG. 6C, in some embodiments the bore 126 includes a first segment 134 and a second segment 136. The first segment 134 extends from, and is open relative to, the interior side 120. The second segment 136 extends from, and is open relative to, the exterior side 122, and has a transverse dimension greater than that of the first segment 134. More particularly, the second segment 136 is sized and shaped to maintain a male or female fastener, and can have a hexagonal shape (as illustrated in FIG. 6B). Other shapes are also acceptable in alternative embodiments, with the corresponding male or female fastener exhibiting a similar shape for subsequent assembly. In yet other embodiments, differing manufacturing techniques can be employed for coupling the fastener to the head 116 and/or the bore 126 can be uniform. Regardless, by providing the head 116 as a universal item, the differing connectors 110-114, and thus the plurality of connector assemblies 24, are readily manufactured on a mass production basis.

Figure 7A:
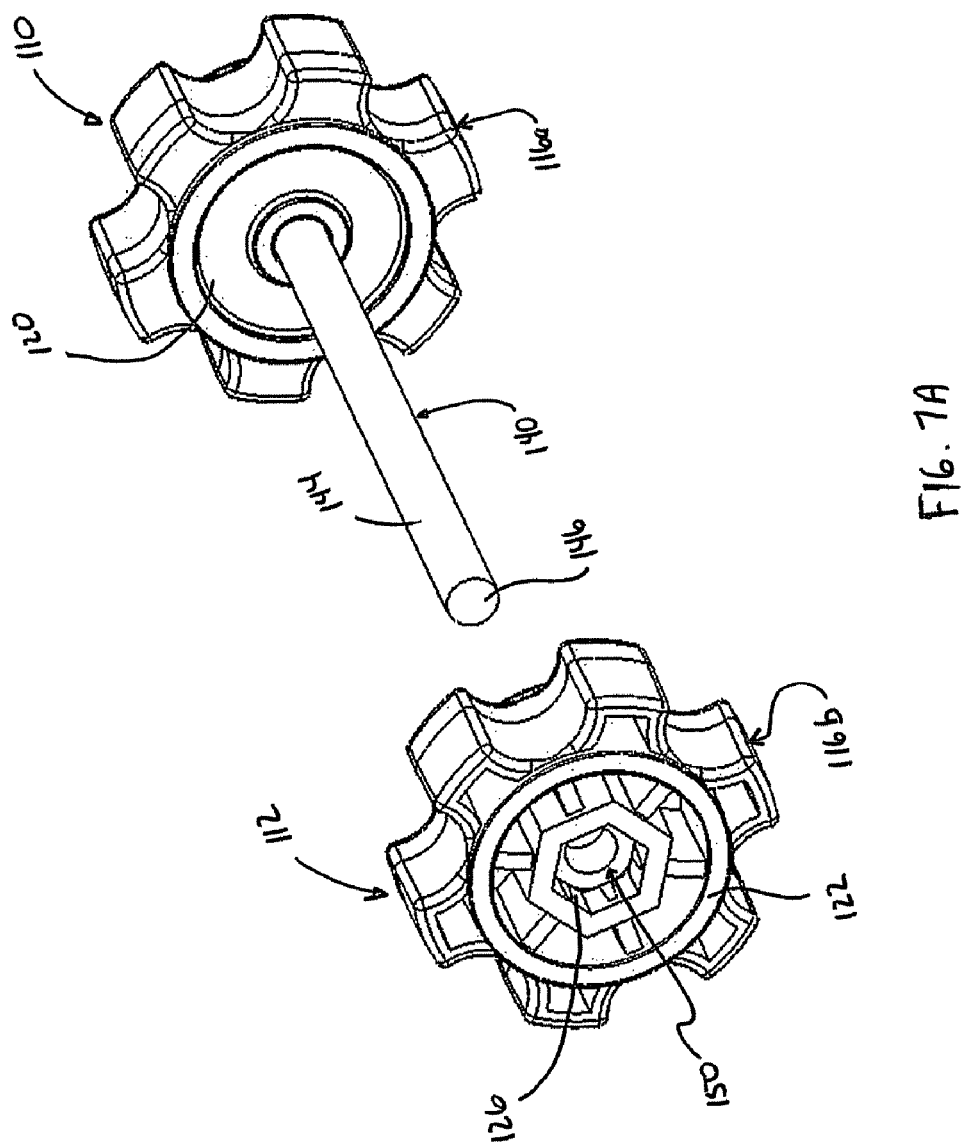
FIGS. 7A and 7B are perspective views of male and female connectors useful with the kit of FIG. 1.
Figure 7B:
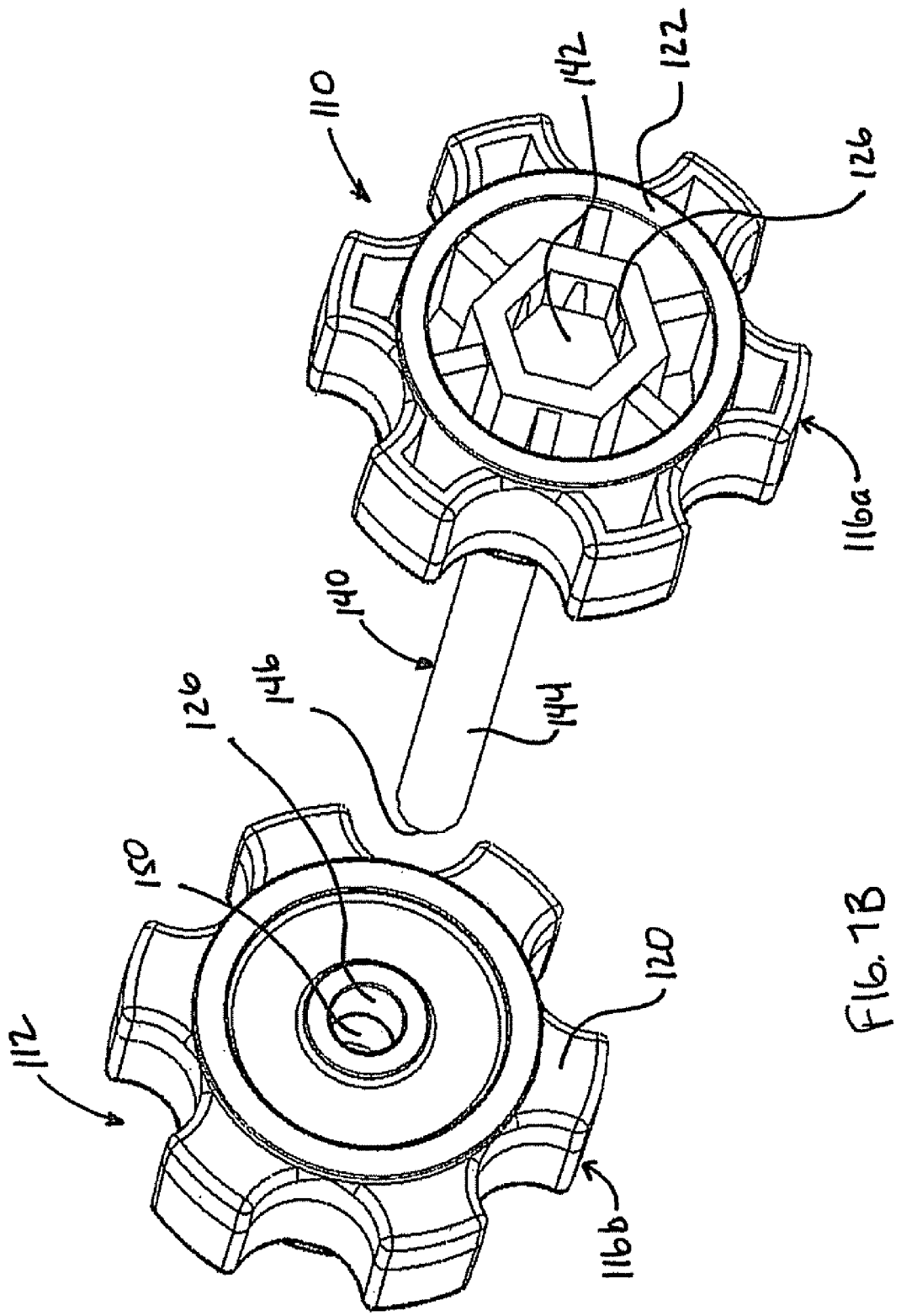

With the above understanding of the head 116 in mind, the male connector 110 includes a male fastener 140 assembled to, and extending from, the head 116 as shown in FIGS. 7A and 7B. For purposes of clarification, the male connector head is labeled as "116a" in FIGS. 7A and 7B. The male fastener 140 can assume a variety of forms, and in some embodiments is a threaded metal machine bolt including a base 142 (best seen in FIG. 7B) and an exteriorly threaded shaft 144. The base 142 can be connected within the bore 126 of the head 116a in various manners. For example, the base 142 can be sized to be frictionally retained within the bore 126 (e.g., hexagonal shape); the head 116a can be molded about the base 142; etc. Regardless, the shaft 144 projects from the interior side 120 of the head 116a, terminating at an end 146. Extension of the shaft 144 from the interior side 120 defines a male fastener extension length. The base 142 is effectively embedded within the thickness $T_H$ (best shown in FIG. 6C) of the head 116a, and is laterally spaced from the exterior side 122 (FIG. 7B). Thus, while the base 142 is exteriorly accessible via the exterior side 122/bore 126, the exterior side 122 exteriorly shrouds or protects the exposed portion of the base 142.

The female connector 112 includes the head (labeled as "116b" in FIGS. 7A and 7B for purposes of clarification), and a female fastener 150. The female fastener 150 can assume various forms, and is generally configured to selectively engage with the male fastener 140. Thus, in some embodiments, the female fastener 150 is an internally threaded metal nut. As with the male fastener 140, the female fastener 150 can be assembled to the head 116b in a number of manners, including inserting and frictionally retaining the female connector/nut 150 within the bore 126 of the head 116b. Thus, where the bore 126 has a hexagonal shape, the female connector/nut 150 is also hexagonal. Alternatively, the head 116b can be molded about the female connector 150. Regardless, the female connector 150 is effectively embedded within the thickness $T_H$ (best shown in FIG. 6C) of the head 116b. With this configuration, while the female connector 150 is exteriorly accessible via the bore 126, the sides 120, 122 exteriorly shroud and protect the female connector 150.

Returning to FIG. 1, the kit 20 provides for a multiplicity of different arrayed configurations in which the connector assemblies 24 interconnect the arrayed PV modules 22 in a non-penetrating manner. For example, FIG. 8 illustrates one simplified array 170 facilitated by the kit 20 in accordance with the present disclosure. The array 170 consists of first-fourth PV modules 22a-22d, and first-fifth connector assemblies 24a-24e. In the mounted array state of FIG. 8, one or more junctions 172 (referenced generally) are provided at which two or more of the PV modules 22a-22d are interconnected via a corresponding one of the connector assemblies 24a-24e.

Figure 9B:
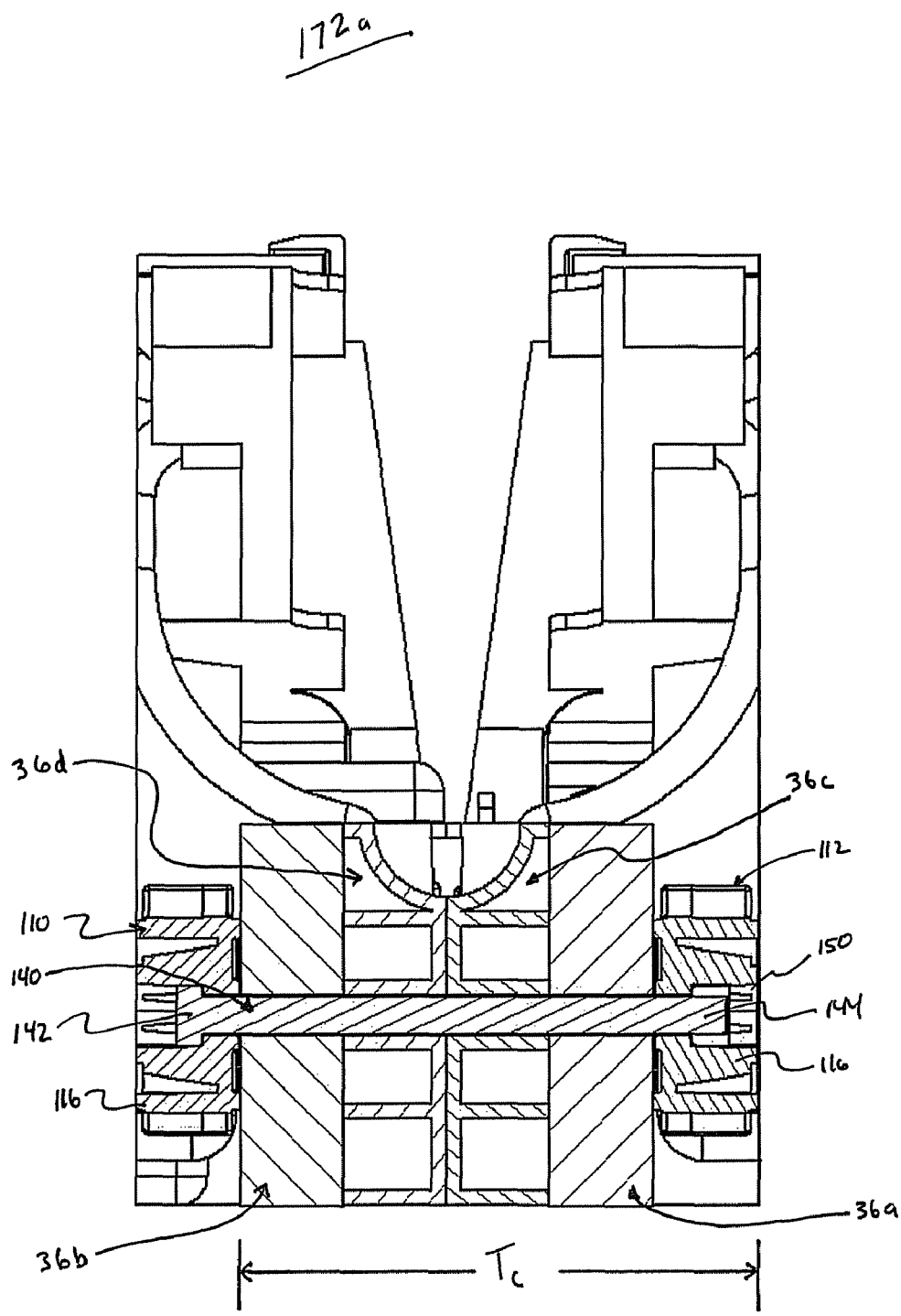
FIG. 9B is a simplified, cross-sectional view of the junction of FIG. 9A.

For example, a first junction 172a defines a common interconnection between each of the four PV modules 22a-22d. The first junction 172a is shown in greater detail in FIG. 9A, and consists of the mounting regions 38 (best identified in FIG. 2) of the first arm 36a of the first PV module 22a, the third arm 36c of the third PV module 22c, the fourth arm 36d of the fourth PV module 22d, and the second arm 36b of the second PV module 22b, as well as the first connector assembly 24a. The first connector assembly 24a includes one of the male connectors 110 and one of the female connectors 112. Though hidden in the view of FIG. 9A, the passages 96 associated with the mounting region 38 of each of the arms 36a-36d are aligned with one another, and the male connector 110 is engaged with the female connector 112. More particularly, the shaft 144 extends through the aligned passages 96, and is threadably engaged with the female fastener 150 as shown in FIG. 9B. In this regard, the arms 36a-36d can be rigidly affixed relative to one another by screwing/tightening of the male and female connectors 110, 112, such that the head 116 of the female connector 112 frictionally engages the first arm 36a, and the head 116 of the male connector 110 frictionally engages the second arm 36b in a locked state. In some embodiments, the heads 116 are readily grasped by the hands of an installer, such that the locked junction can be achieved by hand tightening, without use of tools. Where desired, however, a tool(s) can be employed to further tighten the connector assembly 24a.

With embodiments in which at least the arms 36a-36d of each of the PV modules 22a-22d are formed of plastic or other non-electrically conductive material, the resultant first junction 172a is characterized as being substantially electrically insulated. More particularly, and with continued reference to FIG. 9B, the male fastener extension length of the shaft 144 is less than a combined thickness $T_C$ defined by the arms 36a-36d and the head 116 of the female connector 112. With this construction, while in the locked state of FIG. 9B in which the shaft 144 extends to and threadably engages with the female fastener 150, the shaft 144 does not overtly project outwardly beyond the female connector 112. Thus, an entirety of the shaft 144 is essentially transversely encompassed by plastic or other electrically non-conductive material. Further, while the base 142 of the male fastener 140 as well as the female fastener 150 are somewhat exposed via the bore 126 of the corresponding head 116, the base 142 and the female fastener 150 are laterally and partially longitudinally shrouded or covered by the corresponding head 116. Thus, the heads 116 effectively render the metal components 142, 150 inaccessible by an installer's fingers, such that that the first junction 172a does not require electrical grounding. Finally, FIG. 9B generally reflects frictional engagement between the first arm 36a and the head 116 of the female connector 112, as well as frictional engagement between the second arm 36b and the head 116 of the male connector 110 in the locked state.

Figure 9C:
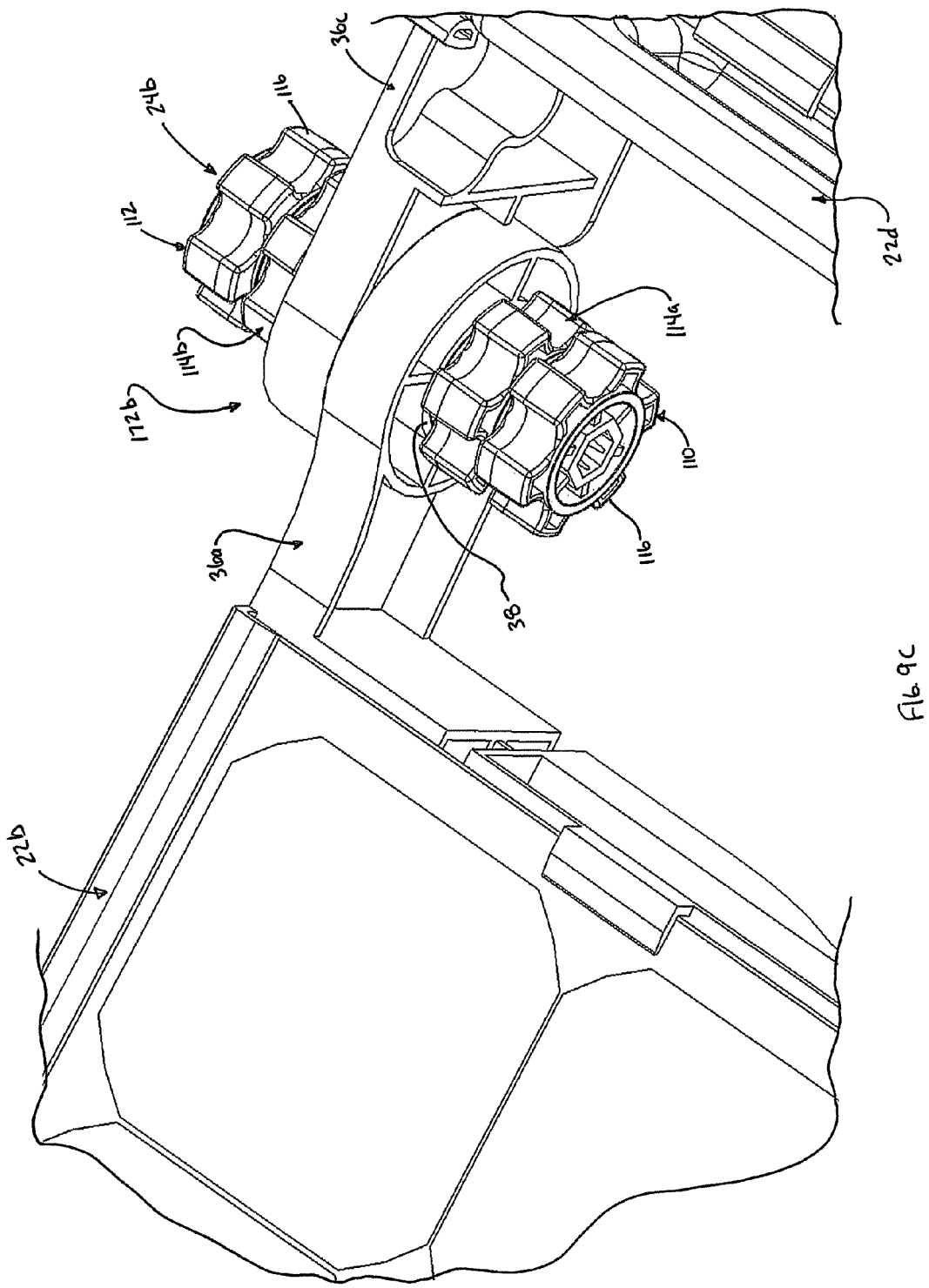
FIGS. 9C-9E are perspective views of other junctions provided with the array installation of FIG. 8.

Returning to FIG. 8, a second junction 172b is formed between the second and fourth PV modules 22b, 22d by the second connector assembly 24b. As shown in FIG. 9C, the second junction 172b consists of the mounting regions 38 (referenced generally) of the first arm 36a of the second PV module 22b and the third arm 36c of the fourth PV module 22d, as well as the second connector assembly 24b. The second connector assembly 24b includes one of the male connectors 110, one of the female connectors 112, and two of the spacer connectors 114a, 114b. Once again, the mounting region 38 of each of the arms 36b, 36d are aligned, with the shaft 144 (FIGS. 7A and 7B) extending through the corresponding passages 96 (hidden in FIG. 9C). The spacer connectors 114a, 114b are similarly arranged relative to the shaft 144, with the shaft 144 extending through the corresponding bores 126 (FIGS. 6A and 6B). The male connector 110 is engaged with the female connector 112 as previously described, with tightening of the components 110, 112 effectuating a rigid, frictional lock or engagement between the arms 36b, 36d via the spacer connectors 114a, 114b. While the spacer connectors 114a, 114b are illustrated as being arranged at opposite sides of the arms 36a or 36c, respectively, in other constructions, the second junction 172b can include both of the spacer connectors 114a, 114b being positioned at one side of either of the arms 36a, 36c. Regardless, the thickness $T_H$ (FIG. 6C) of each of the spacer connectors 114a, 114b (via the corresponding head 116) is akin to the mounting region thickness $T_A$ (FIG. 5C) of each of the arms 36a, 36c. As a result, the combined thicknesses of the arms 36a, 36c, the spacer connectors 114a, 114b, and the head 116 of the female connector 112 encompass the shaft 144. Thus, the second junction 172b is substantially electrically insulated as described above with respect to the first junction 172a (FIG. 8).

Returning to FIG. 8, a third junction 172c is essentially identical to the second junction 172b described above, except that it is formed by the mounting regions 38 (referenced generally) of the second arm 36b of the first PV module 22a, and the fourth arm 36d of the third PV module 22c, as well as the third connector assembly 24c. In this regard, though not fully visible in FIG. 8, the third connector assembly 24c includes one of the male connectors 110, one of the female connectors 112, and two of the spacer connectors 114 as described above.

Figure 9D:
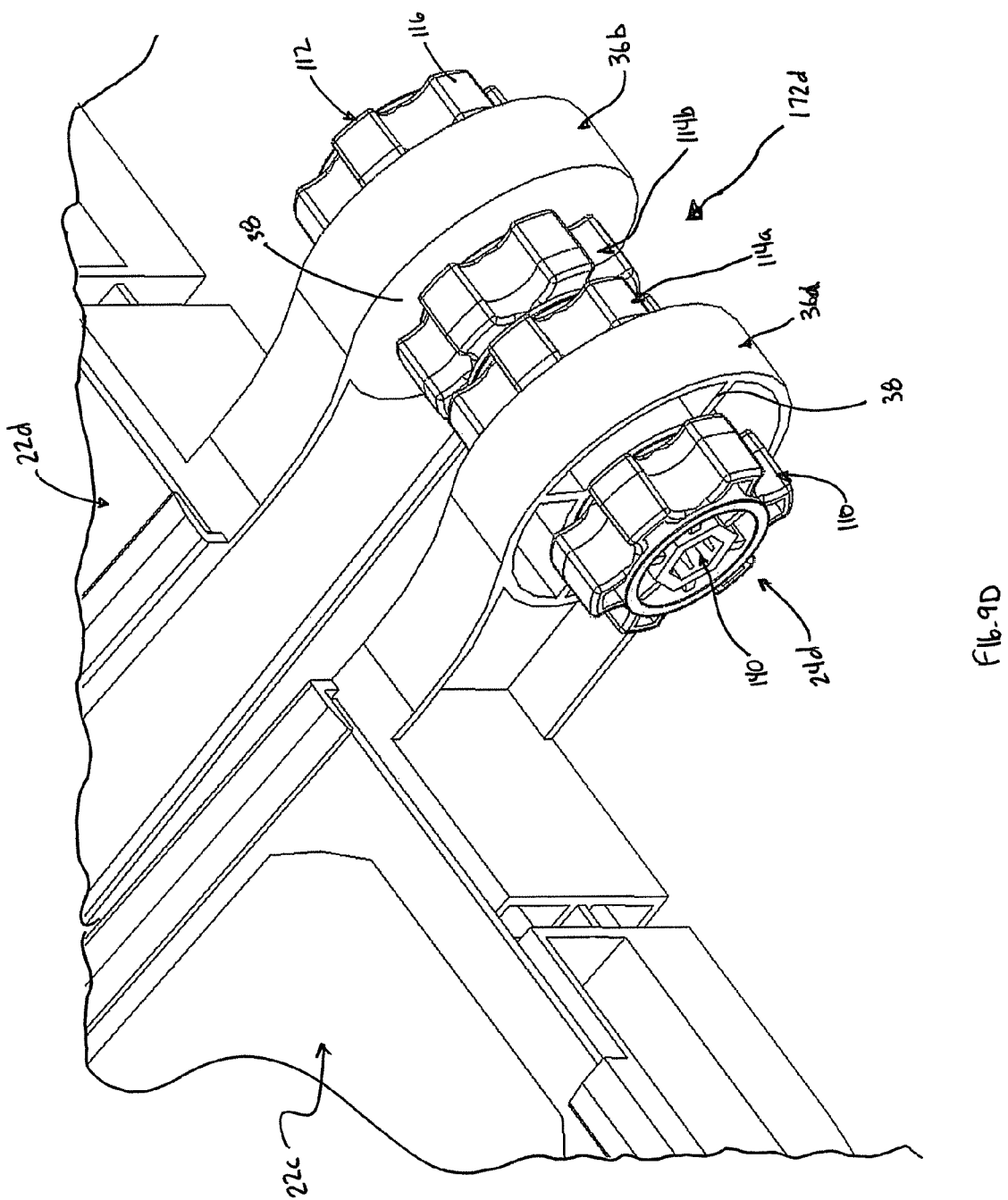

A fourth junction 172d of the array 170 includes the mounting regions 38 (referenced generally) of the first arm 36a of the third PV module 22c and the second arm 36b of the fourth PV module 22d, as well as the fourth connector assembly 24d. Once again, the mounting regions 38 associated with the arms 36a, 36b are aligned, with the fourth connector assembly 24d establishing a rigid connection between the mounting regions 38. With reference to FIG. 9D, the fourth connector assembly 24d includes one of the male connectors 110, one of the female connectors 112, and two of the spacer connectors 114a, 114b. The spacer connectors 114a, 114b are assembled over the shaft 144 (FIGS. 7A and 7B) of the male connector 110, and positioned between the arms 36a, 36b. The head thickness $T_H$ (FIG. 6C) of the spacer connectors 114a, 114b/ heads 116 are commensurate with the thickness $T_A$ (FIG. 5C) of the arm mounting regions 38, such that upon final assembly, the metal male fastener 140 and the metal female fastener 150 (FIGS. 7A and 7B) are substantially electrically insulated as previously described.

Figure 9E:
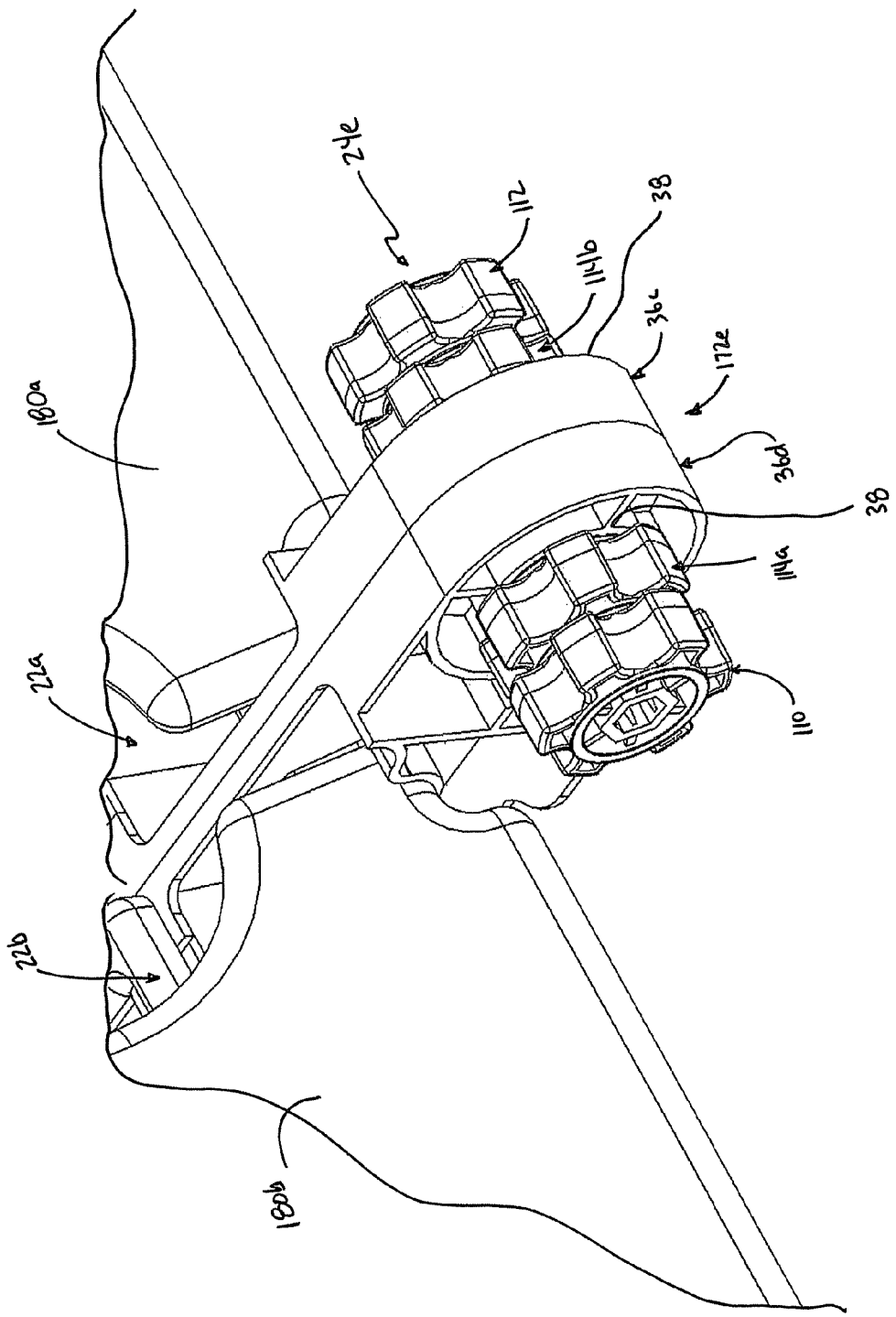

Returning to FIG. 8, a fifth junction 172e includes the mounting regions 38 (referenced generally) of the third arm 36c of the first PV module 22a and the fourth arm 36d of the second PV module 22b, as well as the fifth connector assembly 24e. As shown in FIG. 9E, the fifth connector assembly 24e includes one of the male connectors 110, one of the female connectors 112, and two of the spacer connectors 114a, 114b. Once again, the mounting regions 38 provided by the arms 36c, 36d are aligned, and are rigidly interconnected via the fifth connector assembly 24e. As shown, the spacer connectors 114a, 114b are positioned at opposite sides of the arms 36c, 36d and serve to ensure substantial electrical insulation of the fifth junction 172e as described above. Notably, FIG. 9E illustrates an optional wind deflector 180a, 180b assembled to the PV modules 22a, 22b, respectively.

The array 170 of FIG. 8 is but one example of a non-penetrating installation provided by PV module kits in accordance with the present disclosure to a substantially flat surface (e.g., maximum pitch of 2:12). Any number of PV module can be interconnected to one another via any number of the connector assemblies 24. In general terms, one of the connector assemblies 24 is provided for each PV module junction. Where the junction in question consists of four PV modules, the corresponding connector assembly includes one of the male connectors 110 and one of the female connectors 112. If less than four PV modules are joined together at the junction in question, then one of the spacer connectors 114 is inserted for every "missing" PV module 22. The spacer connector(s) 114 prevent excess bolt material from being exposed, and thus limits potential electrocution hazards. Further, the connector assemblies 24 establish a rigid connection between the PV module frames (via friction) such that in an arrayed format, each row of the array will contribute to the prevention of an adjacent row overturning by resisting the moment forces created at the corresponding junctions.

In addition to promoting rapid assembly of the desired array without requiring use of hand tools, PV module kits, and corresponding assembled PV module arrays, in accordance with the present disclosure optionally facilitate straightforward modification of an installed array. More particularly, the connector assemblies 24 can be assembled to the corresponding PV modules 22 in the locked state as described above whereby the corresponding PV modules 22 are frictionally, rigidly interconnected. In addition, the connector assemblies 24 can be arranged in a loosened state whereby the corresponding PV modules 22 are loosely interconnected, but moveable relative to one another about the connector assembly 24 (i.e., the male connector 110 is coupled to the female connector 112, but the components 110, 112 are not sufficiently tightened rigidly engage the PV modules 22). In the loosened state, adjacent ones of the PV modules 22 comprising a particular junction can be slightly rotated relative to one another to accommodate variations along the installation surface. Thus, the corresponding array readily conforms to a roof having non-uniform flatness (i.e., with localized changes in pitch) by the "adjustment" of the connection/junction points before tightening of the corresponding connector assembly (e.g., to accommodate changes in pitch in the north-south direction). An inherent flexibility of the PV module arms can further promote conformance of the array to installation surface non-uniformities (e.g., for changes in pitch in the east-west direction).

Figure 10A:
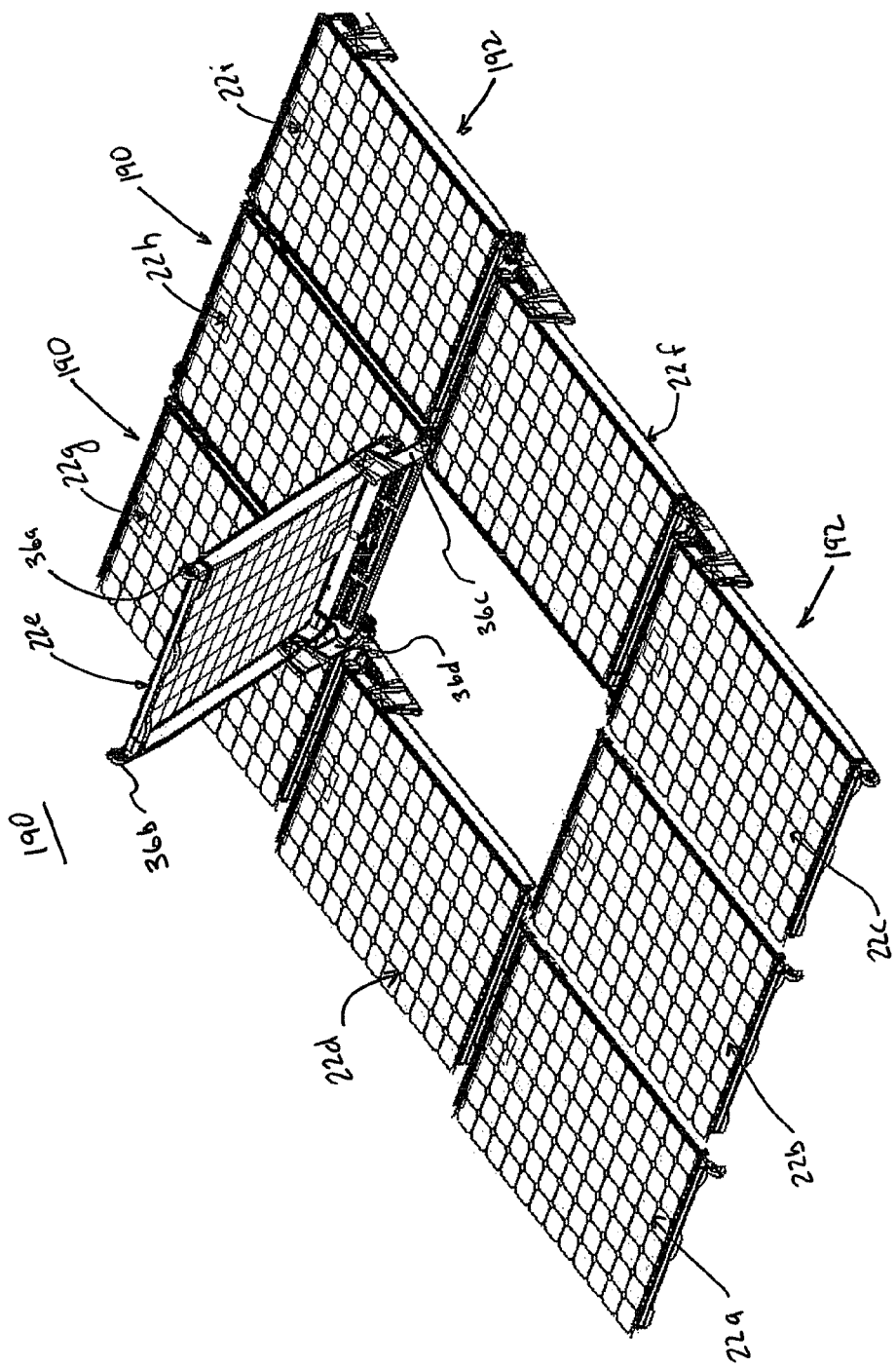

In addition to the above, loosening and/or removal of two (or more) of the connector assemblies 24 associated with a particular PV module 22 permits more overt movement of the PV module 22. For example, FIG. 10A illustrates an alternative PV module array 190 consisting of first-ninth PV modules 22a-22i arranged in columns 192 and rows 194. The PV modules 22a-22i are generally interconnected to one another at junctions via corresponding ones of the connector assemblies 24 (referenced generally). With respect to the fifth PV module 22e, however, the connector assemblies have been removed from engagement (or not initially assembled to) with the first and second arms 36a, 36b thereof. Further, the connector assemblies 24a-24b associated with the third and fourth arms 36c, 36d, respectively, are in a loosened state whereby the arms 36c, 36d are connected with the adjacent PV modules 22d, 22f-22i, but are moveable relative thereto. In particular, the fifth PV module 22e can be rotated relative to the array 190, with the arms 36c, 36d pivoting about the male fastener 140 (FIGS. 7A and 7B) associated with the first and second connector assembly 24a, 24b, respectively. FIG. 10B illustrates a similar, rotated arrangement of the fifth PV module 22e relative to the array 190, with the fifth PV module 22e pivoting at the first and second arms 36a, 36b. Finally, FIG. 10C reflects the fifth PV module 22e being entirely removable from the array 190 by removing the corresponding connector assemblies 24 (not shown) from the first-fourth arm 36a-36d.

By disengaging two of the connector assemblies 24 from the arm pairs 36a, 36b or 36c, 36d of any given PV module 22 within an array, the PV module 22 can be rotated upward in order to provide access to the installation surface (i.e., rooftop).

Further, if all four connections associated with a particular PV module 22 are removed, the PV module 22 can be lifted completely free of the array.

The connector assemblies 24 described above are but one acceptable configuration in accordance with aspects of the present disclosure. For example, the head 116 (FIG. 6A) can include or form transversely extending protrusions (e.g., a sunburst pattern) that directly engage with corresponding slots formed in or by the mounting region 38 provided by the PV module frame 30 (FIG. 2). With this configuration, a more rigid engagement can be achieved via discrete angle interface.

Figure 11A:
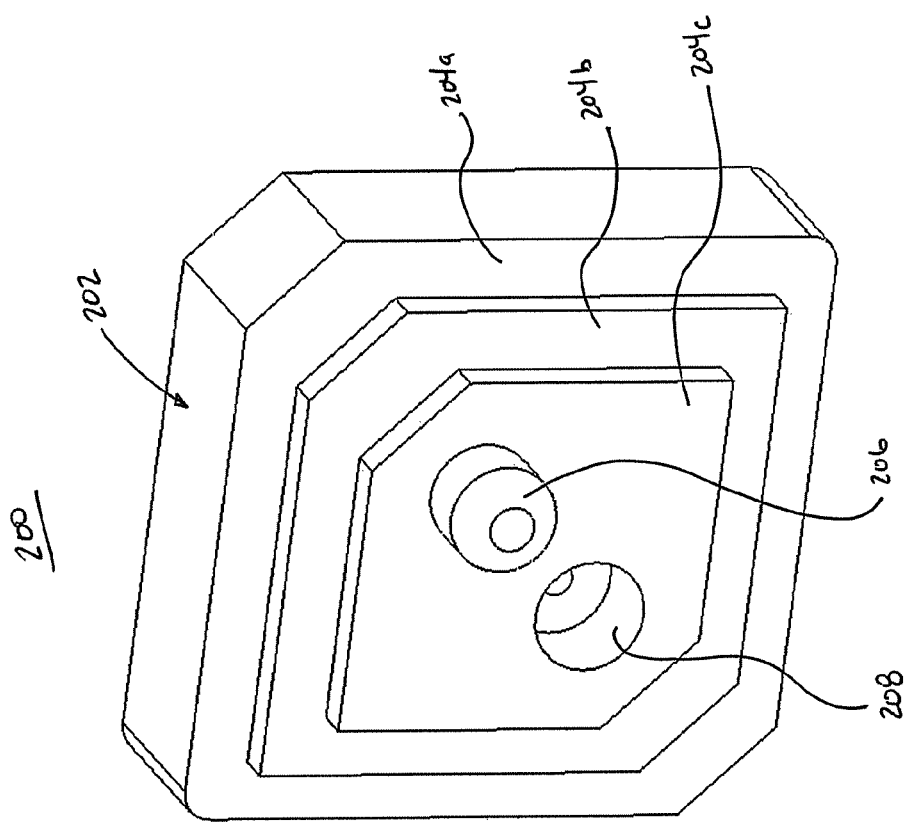
FIG. 11A is a perspective view of an alternative connector assembly useful with the kit of FIG. 1.

Yet another embodiment connector assembly 200 is shown in FIG. 11A and includes a connector or head 202 forming a plurality of ledges 204a-204c, a male fastener 206 and a female fastener 208 (e.g., a bore). The stepped arrangement of the ledges 204 is sized to fit within a hole 210 provided by a corresponding PV module frame 212 as shown in FIG. 11B. In this regard, the hole 210 is defined by a plurality of stepped shoulders 214a-214c that correspond with the stepped ledges 204a-204c (FIG. 11A).

Figure 12:
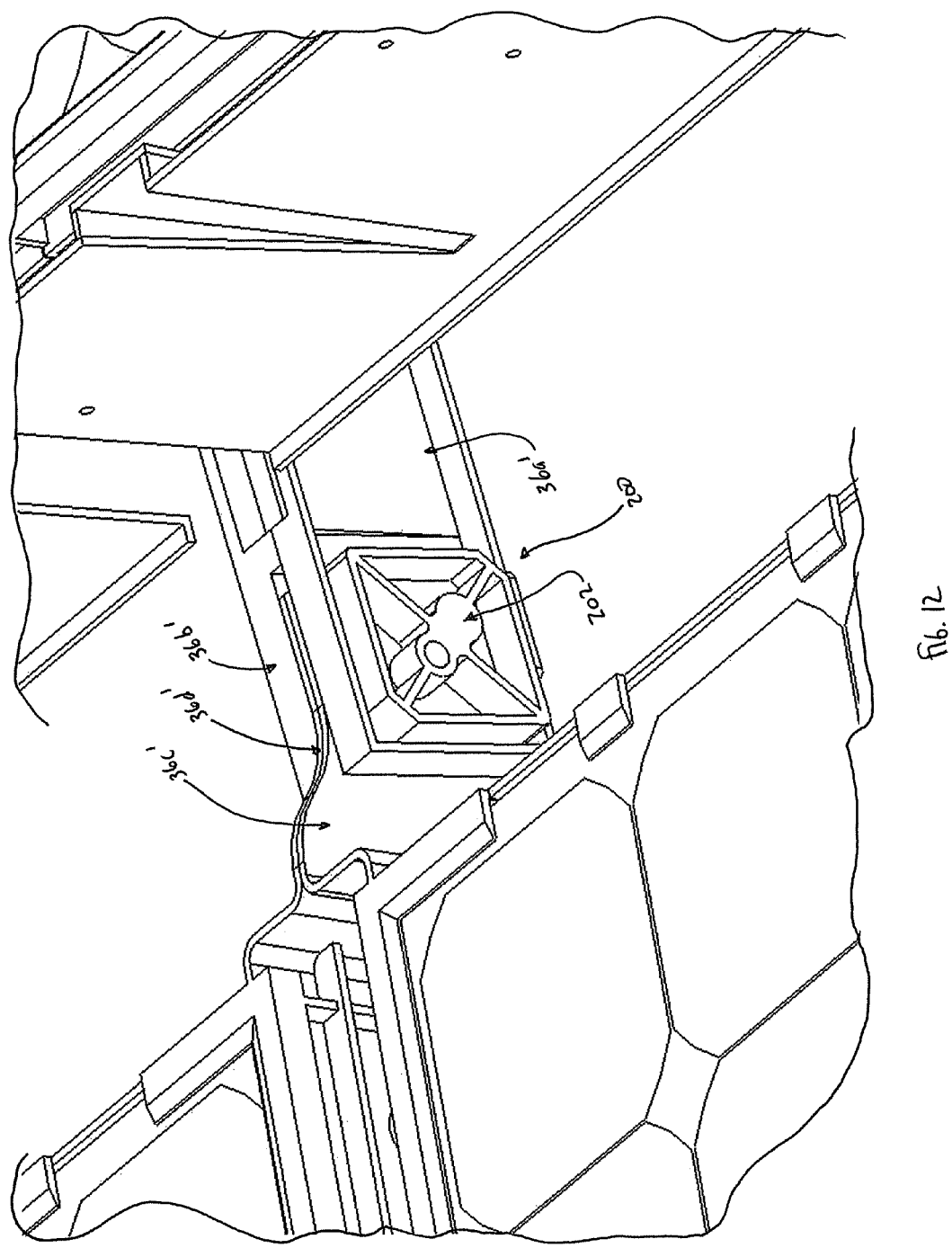
FIG. 12 is an enlarged view of a portion of a photovoltaic module junction incorporating the connector assembly of FIG. 11A.

During use, and with reference to FIG. 12, a pair of the connectors 202 (one of which is visible in FIG. 12) are assembled "across" an arrangement of PV module frame arms 36a'-36d', with the male fastener 206 (FIG. 11A) of each connector 202 passing through the holes 210 (FIG. 11B) of the arms 36a'-36d' and engaging with the female fastener 208 of the other connector 202. As a result, the connector assembly 200 can be deployed to interconnect four of the PV module arms 36a'-36d' as shown in FIG. 12. Where the junction in question consists of only two of the arms 36a'-36d', the stepped interface relationship between the ledges 204a-204c (FIG. 11A) and the shoulders 214a-214c (FIG. 11B) positions the connectors 202 at a desired location relative to one another for "locking" the two arms 36a-36d'. Regardless, the connector assembly 200 provides a rigid interconnection (e.g., resistance to rotational movement of the connected PV modules) due to an inability of the square-like head 202 to rotate within the square-like hole 210. In some embodiments, a few degrees of rotation are designed into the parts to accommodate localized changes in pitch of the installation surface.

Although the present disclosure has been described with reference to preferred embodiments, workers skilled in the art will recognize that changes can be made in form and detail without departing from the spirit and scope of the present disclosure. For example, while the frame has been described as including four of the arms, in other embodiments, a lesser or greater number can be provided. Along these same lines, while the various arms have been described as being formed as part of certain frame members (e.g., the side frame members), in other embodiments, one or more of the arms can project from (or be formed as part of) other(s) of the frame members.

What is claimed is:

1. A photovoltaic module kit for non-penetrating installation on a substantially flat installation surface, the kit comprising:
    a plurality of photovoltaic modules each including:
        a photovoltaic laminate,
        a framework encompassing a perimeter of the photovoltaic laminate and forming a mounting region; and
    a plurality of connectors including:
        a male connector having a male fastener extending from a head,
        a female connector having a female fastener adapted for engagement with the male fastener and assembled within a head,
        wherein the heads are entirely formed of plastic;
    wherein the kit is configured to provide a mounted array state having a first junction at which the mounting regions of at least two of the photovoltaic modules are aligned and interconnected by engagement of the male connector with the female connector, the first junction being substantially electrically insulated; and
    wherein the frame of each of the photovoltaic modules includes framework encompassing a perimeter of the corresponding photovoltaic laminate and a plurality of arms extending from and beyond the framework, the arms each providing a respective one of the mounting regions, and further wherein the first junction further includes one arm from each of a first, second, third, and fourth photovoltaic module interconnected by the male connector engaged with the female connector.

2. The kit of claim 1, wherein the male and female fasteners are metal.

3. The kit of claim 2, wherein the first junction includes the metal fasteners substantially encompassed within plastic.

4. The kit of claim 3, wherein the male fastener is a bolt having a shaft defining a length, and further wherein the first junction includes contiguously arranged plastic components forming a passageway, a length of the passageway combined with a thickness of the head of the female connector being greater than the length of the bolt.

5. The kit of claim 4, wherein the bolt has a base embedded within the head of the male connector.

6. The kit of claim 5, wherein the female connector is a nut embedded within the corresponding head.

7. The kit of claim 1, wherein the plurality of connectors further includes:

a spacer connector including a head forming a bore sized to slidably receive a portion of the male fastener.

8. The kit of claim 7, wherein the heads are identical.

9. The kit of claim 8, wherein each of the heads has a circular perimeter forming a plurality of finger grooves.

10. The kit of claim 7, wherein the first junction further includes two of the spacer connectors.

11. The kit of claim 1, wherein the frame of each of the photovoltaic modules is entirely formed of plastic.

12. The kit of claim 1, wherein the male and female connectors are configured to be transitioned between locked and loosened states, the locked state including the head of the male connector frictionally engaging an arm of the first photovoltaic module and the head of the female connector frictionally engaging an arm of the fourth photovoltaic module.

13. The kit of claim 12, wherein the loosened state includes the arms of the first junction being rotatable about a bolt portion of the male connector.

14. The kit of claim 1, wherein the connectors include a plurality of male connectors and a plurality of female connectors, and further wherein the mounted array state provided by the kit includes a second junction comprising:
the mounting region of a second arm of the first photovoltaic module aligned with the mounting region of a second arm of the second photovoltaic module and interconnected by a second male connector assembled to a second female connector.

15. The kit of claim 14, wherein the connectors further include a plurality of spacer connectors each including a head forming a bore sized to slidably receive a portion of the male fastener, and further wherein the kit is configured such that the second junction includes a first spacer positioned between the head of the second male connector and the second arm of the first photovoltaic module, and a second spacer positioned between the head of the second female connector and the second arm of the second photovoltaic module.

16. The kit of claim 14, wherein the connectors further includes a plurality of spacer connectors each including a head forming a bore sized to slidably received a portion of the male fastener, and further wherein the kit is configured such that the second junction includes two of the spacer connectors positioned between the second arms.

17. A photovoltaic module kit for non-penetrating installation on a substantially flat installation surface, the kit comprising:
a plurality of identically formed photovoltaic modules each including:
a photovoltaic laminate,
framework encompassing a perimeter of the photovoltaic laminate,
first and second arms extending from and outwardly beyond a first end of the framework,
third and fourth arms extending from and outwardly beyond a second end of the framework opposite the first end,
wherein the arms each form a mounting region;
a plurality of identically formed connector heads each forming a bore;
a plurality of male fasteners extending from some of the connector heads, respectively, to define male connectors; and
a plurality of female fasteners attached to some of the connector heads, respectively, to define female connectors;
wherein at least some of the connector heads define spacer connectors;
wherein the kit is configured to provide a plurality of installation junctions between two or more of the photovoltaic modules in a mounted array including:
a plurality of first junctions including one of the male connectors and one of the female connectors interconnecting one of the mounting regions of four of the photovoltaic modules, respectively,
a plurality of second junctions each including one of the male connectors, one of the female connectors, and two of the spacer connectors interconnecting one of the mounting regions of two of the photovoltaic modules, respectively.

18. The kit of claim 17, wherein the framework, the arms, and the heads are entirely formed of plastic.

19. The kit of claim 18, wherein the male fastener is a threaded bolt and the female fastener is a threaded nut.

20. The kit of claim 17, wherein the kit includes two male connectors, two female connectors, and four spacer connectors for each one of the photovoltaic modules.

21. A photovoltaic module installation comprising:
an array of photovoltaic modules comprising columns and rows of identically formed photovoltaic modules, the array including a first photovoltaic module comprising:
a photovoltaic laminate,
framework encompassing a perimeter of the photovoltaic laminate,
first and second arms extending from and outwardly beyond a first end of the framework,
third and fourth arms extending from and outwardly beyond a second framework opposite the first end,
a first connector assembly removably interconnecting the first arm with a photovoltaic module adjacent the first photovoltaic module;
a second connector assembly removably interconnecting the second arm with a photovoltaic module adjacent the first photovoltaic module;
a third connector assembly removably interconnecting the third arm with a photovoltaic module adjacent the first photovoltaic module; and
a fourth connector assembly removably interconnecting the fourth arm with a photovoltaic module adjacent the first photovoltaic module;
wherein the connector assemblies each include:
a male connector comprising a head and a male fastener,
a female connector comprising a head and a female fastener,
wherein the heads are identically formed.

22. The installation of claim 21, wherein at least one of the connector assemblies further includes two spacer connectors each comprising a head forming a bore sized to slidably receive a portion of the male fastener.

23. The installation of claim 21, wherein each of the connector assemblies are transitionable by hand between a tightened state, a loosened state, and a removed state, and further wherein in the removed state of the third and fourth connector assemblies and in a loosened state of the first and second connector assemblies, the first photovoltaic module is pivotable relative to the array at the first and second arms.

24. The installation of claim 21, wherein:
the first connector assembly interconnects the first arm with:
a second photovoltaic module in a first column adjacent the first photovoltaic module and in a row of the first photovoltaic module,
a third photovoltaic module in the first column and in a first row adjacent the first photovoltaic module, a fourth photovoltaic module in a column of the first photovoltaic module and in the first row;

the second connector assembly interconnects the second arm with:
  a fourth photovoltaic module,
  a fifth photovoltaic module in a second column adjacent the first photovoltaic module and in the first row,
  a sixth photovoltaic module in the second column and the row of the first photovoltaic module,
  a seventh photovoltaic module in the second column and in a second row adjacent the first photovoltaic module;

the third connector assembly interconnects the third arm with:
  the sixth photovoltaic module,
  the seventh photovoltaic module,
  an eighth photovoltaic module in the column of the first photovoltaic module and the second row; and the fourth connector assembly interconnects the fourth arm with:
  the eighth photovoltaic module,
  a ninth photovoltaic module in the first column and the second row,
  the second photovoltaic module.

25. A method of installing a photovoltaic module array in a non-penetrating fashion to a substantially flat installation surface comprising:
  providing a plurality of photovoltaic modules each comprising:
    a photovoltaic laminate,
    framework encompassing a perimeter of the photovoltaic laminate,
    first and second arms extending from and outwardly beyond a first end of the framework,
    third and fourth arms extending from an outwardly beyond a second end of the framework opposite the first end,
    wherein each of the arms forms a mounting region;
  arranging the photovoltaic modules in an array comprising columns and rows; and
  rigidly interconnecting at least one arm of each of the photovoltaic modules with at least one arm of another, adjacent one of the photovoltaic modules via a corresponding connector assembly comprising at least a male connector and a female connector;
  wherein the step of rigidly interconnecting is accomplished by hand without the use of a tool.

* * * * *